US008010874B2

(12) United States Patent
Corbett et al.

(10) Patent No.: US 8,010,874 B2
(45) Date of Patent: *Aug. 30, 2011

(54) TRIPLE PARITY TECHNIQUE FOR ENABLING EFFICIENT RECOVERY FROM TRIPLE FAILURES IN A STORAGE ARRAY

(75) Inventors: Peter F. Corbett, Lexington, MA (US); Atul Goel, Foster City, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/613,743

(22) Filed: Nov. 6, 2009

(65) Prior Publication Data
US 2010/0050015 A1 Feb. 25, 2010

Related U.S. Application Data

(63) Continuation of application No. 11/304,369, filed on Dec. 15, 2005, now Pat. No. 7,640,484, which is a continuation-in-part of application No. 10/035,607, filed on Dec. 28, 2001, now Pat. No. 6,993,701.

(51) Int. Cl.
*G11C 29/00* (2006.01)
(52) U.S. Cl. ........ 714/770; 714/756; 714/764; 714/776; 714/800
(58) Field of Classification Search .................. 714/756, 714/763, 764, 770, 775, 776, 800
See application file for complete search history.

(56) References Cited

U.S. PATENT DOCUMENTS
3,876,978 A 4/1975 Bossen et al.
4,092,732 A 5/1978 Ouchi
4,201,976 A 5/1980 Patel
4,205,324 A 5/1980 Patel
4,375,100 A 2/1983 Tsuji et al.
4,435,807 A 3/1984 Scott et al.
4,467,421 A 8/1984 White
4,517,663 A 5/1985 Imazeki et al.
(Continued)

FOREIGN PATENT DOCUMENTS
EP 1132914 12/2001
(Continued)

OTHER PUBLICATIONS

Anvin, Peter H, "The Mathematics of RAID 6," Dec. 2004.
Auspex 4Front NS2000, System Architecture, Network-Attached Storage for a New Millennium, Auspex Engineering Technical Report 24, Jan. 1999.
(Continued)

*Primary Examiner* — Esaw T Abraham
(74) *Attorney, Agent, or Firm* — Cesari and McKenna, LLP

(57) ABSTRACT

A method for recovering from three failed data storage devices is disclosed. A plurality of data storage devices hold data, and a row parity storage device holds row parity for them. The data storage devices and the row parity storage device form a set of storage devices. A diagonal parity storage device and an anti-diagonal parity storage device hold parity computed diagonally over the set of storage devices. In the event of a failure of three data storage devices of the set of storage devices, a first failed storage device is chosen for first restoration. A missing block of the first failed storage device is computed by using the remaining set of storage devices, and the diagonal parity storage device, and the anti-diagonal parity storage device. The remaining two failed storage devices are restored by a diagonal parity restoration technique.

22 Claims, 11 Drawing Sheets

U.S. PATENT DOCUMENTS

| | | | |
|---|---|---|---|
| 4,547,882 A | 10/1985 | Tanner | |
| 4,667,326 A | 5/1987 | Young et al. | |
| 4,688,221 A | 8/1987 | Nakamura et al. | |
| 4,722,085 A | 1/1988 | Flora et al. | |
| 4,755,978 A | 7/1988 | Takizawa et al. | |
| 4,761,785 A * | 8/1988 | Clark et al. | 714/805 |
| 4,775,978 A | 10/1988 | Hartness | |
| 4,796,260 A | 1/1989 | Schilling et al. | |
| 4,817,035 A | 3/1989 | Timsit | |
| 4,825,403 A | 4/1989 | Gershenson et al. | |
| 4,837,680 A | 6/1989 | Crockett et al. | |
| 4,847,842 A | 7/1989 | Schilling | |
| 4,849,929 A | 7/1989 | Timsit | |
| 4,849,974 A | 7/1989 | Schilling et al. | |
| 4,849,976 A | 7/1989 | Schilling et al. | |
| 4,870,643 A | 9/1989 | Bultman et al. | |
| 4,899,342 A | 2/1990 | Potter et al. | |
| 4,989,205 A | 1/1991 | Dunphy, Jr. et al. | |
| 4,989,206 A | 1/1991 | Dunphy, Jr. et al. | |
| 5,077,736 A | 12/1991 | Dunphy, Jr. et al. | |
| 5,088,081 A | 2/1992 | Farr | |
| 5,101,492 A | 3/1992 | Schultz et al. | |
| 5,128,810 A | 7/1992 | Halford | |
| 5,148,432 A | 9/1992 | Gordon et al. | |
| RE34,100 E | 10/1992 | Hartness | |
| 5,163,131 A | 11/1992 | Row et al. | |
| 5,166,936 A | 11/1992 | Ewert et al. | |
| 5,179,704 A | 1/1993 | Jibbe et al. | |
| 5,202,979 A | 4/1993 | Hillis et al. | |
| 5,208,813 A | 5/1993 | Stallmo | |
| 5,210,860 A | 5/1993 | Pfeffer et al. | |
| 5,218,689 A | 6/1993 | Hotle | |
| 5,233,618 A | 8/1993 | Glider et al. | |
| 5,235,601 A | 8/1993 | Stallmo et al. | |
| 5,237,658 A | 8/1993 | Walker et al. | |
| 5,257,367 A | 10/1993 | Goodlander et al. | |
| 5,271,012 A | 12/1993 | Blaum et al. | |
| 5,274,799 A | 12/1993 | Brant et al. | |
| 5,305,326 A | 4/1994 | Solomon et al. | |
| 5,351,246 A | 9/1994 | Blaum et al. | |
| 5,375,128 A | 12/1994 | Menon et al. | |
| 5,410,667 A | 4/1995 | Belsan et al. | |
| 5,513,192 A | 4/1996 | Janku et al. | |
| 5,537,567 A | 7/1996 | Galbraith et al. | |
| 5,574,851 A | 11/1996 | Rathunde | |
| 5,579,475 A | 11/1996 | Blaum et al. | |
| 5,623,595 A | 4/1997 | Bailey | |
| 5,657,468 A | 8/1997 | Stallmo et al. | |
| 5,774,643 A | 6/1998 | Lubbers et al. | |
| 5,805,788 A | 9/1998 | Johnson | |
| 5,812,753 A | 9/1998 | Chiariotti | |
| 5,819,292 A | 10/1998 | Hitz et al. | |
| 5,862,158 A | 1/1999 | Baylor et al. | |
| 5,884,098 A | 3/1999 | Mason, Jr. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,041,423 A * | 3/2000 | Tsukerman | 714/19 |
| 6,092,215 A | 7/2000 | Hodges et al. | |
| 6,138,125 A | 10/2000 | DeMoss | |
| 6,138,126 A | 10/2000 | Hitz et al. | |
| 6,138,201 A | 10/2000 | Rebalski | |
| 6,158,017 A | 12/2000 | Han et al. | |
| 6,198,413 B1 | 3/2001 | Widmer | |
| 6,223,300 B1 | 4/2001 | Gotoh | |
| 6,223,323 B1 | 4/2001 | Wescott | |
| 6,247,157 B1 | 6/2001 | Edirisooriya | |
| 6,275,410 B1 * | 8/2001 | Morford | 365/151 |
| 6,279,117 B1 * | 8/2001 | Takeda | 714/5 |
| 6,289,356 B1 | 9/2001 | Hitz et al. | |
| 6,532,548 B1 | 3/2003 | Hughes | |
| 6,557,123 B1 | 4/2003 | Wiencko et al. | |
| 6,571,326 B2 | 5/2003 | Spiegel et al. | |
| 6,581,185 B1 | 6/2003 | Hughes | |
| 6,671,772 B1 | 12/2003 | Cousins | |
| 6,742,137 B1 | 5/2004 | Frey, Jr. | |
| 6,779,095 B2 | 8/2004 | Selkirk et al. | |
| 6,826,580 B2 * | 11/2004 | Harris et al. | 1/1 |
| 6,826,661 B2 * | 11/2004 | Umbehocker et al. | 711/154 |
| 6,851,082 B1 | 2/2005 | Corbett | |
| 6,993,701 B2 | 1/2006 | Corbett et al. | |
| 7,073,115 B2 | 7/2006 | English et al. | |
| 7,203,892 B2 | 4/2007 | Corbett et al. | |
| 7,328,305 B2 | 2/2008 | Kleiman et al. | |
| 7,409,625 B2 | 8/2008 | Corbett et al. | |
| 7,613,984 B2 | 11/2009 | Goel | |
| 7,873,700 B2 | 1/2011 | Pawlowski et al. | |
| 2002/0083037 A1 | 6/2002 | Lewis et al. | |
| 2002/0124137 A1 | 9/2002 | Ulrich et al. | |
| 2006/0129873 A1 | 6/2006 | Hafner | |
| 2007/0089045 A1 | 4/2007 | Corbett et al. | |

FOREIGN PATENT DOCUMENTS

| | | |
|---|---|---|
| EP | 1 324 200 A2 | 7/2003 |
| EP | 02 25 8872 | 5/2006 |
| GB | 2011138 | 2/1982 |
| WO | WO 96/34463 | 10/1996 |
| WO | WO 99/59157 | 11/1999 |
| WO | WO-01/13236 A1 | 2/2001 |
| WO | WO-02/29539 A2 | 4/2002 |
| WO | WO2007/078803 A2 | 7/2007 |
| WO | WO2007/078803 A3 | 7/2007 |
| WO | WO2008/082584 A2 | 7/2008 |
| WO | WO2008/082584 A3 | 7/2008 |

OTHER PUBLICATIONS

Bestavros, Azer, et al., Reliability and Performance of Parallel Disks, Technical Memorandum 45312-891206-01TM, AT&T, Bell Laboratories, Department 45312, Holmdel, NJ, Dec. 1989.

Bitton, Dina, Disk Shadowing, Proceedings of the 14th VLDB Conference, LA, CA (1988).

Blaum, Mario, et al., Evenodd: An Optimal Scheme for Tolerating Double Disk Failures in RAID Architectures, Computer Architectures News, Association for Computing Machinery, New York, US, vol. 22, No. XP000450355, Apr. 1, 1994.

Blaum, Mario, et al., Evenodd: An Efficient Scheme for Tolerating Double Disk Failures in RAID Architectures, IEEE Transactions on Computers, vol. 44, No. 2, Feb. 1995, pp. 192-202.

Bultman, David L., High Performance SCSI Using Parallel Drive Technology, In Proc. BUSCON Conf., pp. 40-44, Anaheim, CA, Feb. 1988.

Chen, Peter et al., Two Papers on RAIDs. Technical Report, CSD-88-479, Computer Science Division, Electrical Engineering and Computer Sciences, University of California at Berkeley (1988).

Chen, Peter M., et al., An Evaluation of Redundant Arrays of Disks Using an Amdahl 5890, Performance Evaluation, pp. 74-85, 1990—check to see if exact same copy as one in WAFL.

Chen, Peter M.., et al, Maximizing Performance in a Striped Disk Array, Proc. 1990 ACM SIGARCH 17th Intern. Symp. on Comp. Arch., Seattle, WA, May 1990, pp. 322-331.

Chen, Peter M., et al., RAID:High Performance, Reliable Secondary Storage, ACM Computing Surveys, 26(2):145-185, Jun. 1994.

Chervenak, Ann L., Performance Measurement of the First RAID Prototype, Technical Report UCB/CSD 90/574, Computer Science Division (EECS), University of California, Berkeley, May 1990.

Copeland, George, et al., A Comparison of High-Availability Media Recovery techniques, in Proc. ACM-SIGMOD Int. Conf. Management of Data, 1989.

Courtright II, William V., et al., RAIDframe: A Rapid Prototyping Tool for RAID Systems, Computer Science Technical Report CMU-CS97-142, Carnegie Mellon University, Pittsburgh, PA 15213, Jun. 4, 1997.

Evans The Tip of the Iceberg:RAMAC Virtual Array—Part I, Technical Support, Mar. 1997, pp. 1-4.

Gibson, Garth A., et al., Coding Techniques for Handling Failures in Large Disk Arrays, Technical Report UCB/CSD 88/477, Computer Science Division, University of California, (Jul. 1988.).

Gibson, Garth A., et al., Failure Correction Techniques for Large Disk Arrays, in Proceedings Architectural Support for Programming Languages and Operating Systems, Boston, Apr. 1989, pp. 123-132.

Gibson, Garth A., et al., Strategic Directions in Storage I/O Issues in Large-Scale Computing, ACM Computing Survey, 28(4):779-93, Dec. 1996.

Goldick, Jonathan S., et al., Multi-resident AFS: An Adventure in Mass Storage, in Proceedings of the 1995 USENIX Technical Conference, pp. 47-58, Jan. 1995.
Graham, Susan L., et al., Massive Information Storage, Management, and Use, (NSF Institutional Infrastructure Proposal), Technical Report No. UCB/CSD 89/493, Jan. 1989.
Gray, Jim et al., Parity striping of disc arrays: Low-Cost Reliable Storage with Acceptable Throughput. In Proceedings of the 16th Very Large Data Bases Conference, pp. 148-161, Brisbane, Australia, 1990.
Grimes, DW Martinez, Two Dimensional Parity Error Correction Procedure, IBM Technical Disclosure Bulletin 2686-2689, Oct. 1982.
Grimes, DW Martinez, Vertical Parity Generator for Two Dimensional Parity, IBM Technical Disclosure Bulletin 2682-2685, Oct. 1982.
Hellerstein, Lisa, et al,. Coding Techniques for Handling Failures in Large Disk Arrays. In Algorithmica vol. 2, No. 3, 182-208 (1994).
Hitz, David, TR3002 File System Design for a NFS File Server Appliance, Network Appliance, Inc.
Hughes, James, et al., High Performance RAIT , Tenth NASA Goddard Conference on Mass Storage Systems and Technologies and Nineteenth IEEE Symposium on Mass Storage Systems, Adelphi, Maryland, USA, Apr. 2002.
Johnson, Theodore, et al, Tape Group Parity Protection, IEEE Symposium on Mass Storage, pp. 72-79, Mar. 1999.
Katz, Randy H. et al., Disk System Architectures for High Performance Computing, undated.
Kent, Jack et al., Optimizing Shadow Recovery Algorithms, IEEE Transactions on Software Engineering, 14(2):155-168, Feb. 1988.
Kim, Michelle Y., Synchronized Disk Interleaving, IEEE Transactions on Computers, C-35(11):978-988, Nov. 1986.
Kim, Michelle, et al., Asynchronous Disk Interleaving Approximating Access Delays, IEEE Transactions on Computers, vol. 40, No. 7, Jul. 1991 , pp. 801-810.
Lawlor, F. D., Efficient Mass Storage Parity Recovery Mechanism, IBM Technical Disclosure Bulletin 24(2):986-987, Jul. 1981.
Lee, Edward K., et al., RAID-II: A Scalable Storage Architecture for High-Bandwidth Network File Service, Technical Report UCB/CSD 92/672, (Feb. 1992).
Lee, Edward K., et al., The Performance of Parity Placements in Disk Arrays, IEEE Transactions on Computers, vol. 42 No. 6, Jun. 1993, 14 pages.
Li, Don, et al., Authors' Reply, IEEE Transactions on Communications, 46:575, May 1998.
Limited Distributed DASD Checksum, A RADI Hybrid, IBW Technical Disclosure Bulletin, IBM Corp. New York, US vol. 35. No. 4A, XP000314813, Sep. 1, 1992.
Livny, Miron, et al., Multi-Disk Management Algorithms, In Proceedings of the ACM International Conference on Measurement and Modeling of Computer Systems (SIGMETRICS), pp. 69-77, Banff, Alberta, Canada, May 1987.
Meador, Wes E., Disk Array Systems, Proceedings of COMPCON, 1989, pp. 143-146.
Menon, Jai, et al., Methods for Improved Update Performance of Disk Arrays, IBM Almaden Research Center, IEEE, Jan. 1992, 10 pages.
Menon, Jai, et al., Floating Parity and Data Disk Arrays, Journal of Parallel and Distributed Computing, Boston: Academic Press. Inc., vol. 17 No. 1 and 2, Jan./Feb. 1993, 13 pages.
Microsoft Computer Dictionary, 5th Edition, 2002, p. 211.
NG, Spencer, et al., Trade-Offs Between Devices and Paths in Achieving Disk Interleaving, IEEE International Symposium on Computer Architecture, 1988, pp. 196-201.
NG, Spencer, Some Design Issues of Disk Arrays, Proceedings of COMPCON Spring '89, pp. 137-142. IEEE, 1989.
Park, Arvin, et al., Providing Fault Tolerance in Parallel Secondary Storage Systems, Technical Report CS-TR-057-86, Princeton, Nov. 1986.
Patel, Arvind M., Adaptive Cross-Parity (AXP) Code for a High-Density Magnetic Tape Subsystem, IBM Technical Disclosure Bulletin 29(6):546-562, Nov. 1985.
Patterson, D., et al., A Case for Redundant Arrays of Inexpensive Disks (RAID), Technical Report, CSD-87-391, Computer Science Division, Electrical Engineering and Computer Sciences, University of California at Berkeley (1987).
Patterson, D., et al., A Case for Redundant Arrays of Inexpensive Disks (RAID), SIGMOD International Conference on Management of Data, Chicago, IL, USA, Jun. 1-3, 1988, SIGMOD Record (17)3:109-16 (Sep. 1988).
Patterson, David A., et al., Introduction to Redundant Arrays of Inexpensive Disks (RAID). In IEEE Spring 89 COMPCON, San Francisco, IEEE Computer Society Press, Feb. 27-Mar. 3, 1989, pp. 112-117.
Storagesuite, Performance Without Compromise: The Virtual Storage Architecture, catalogue, 1997.
Reddy, A. L. Narasimha, et al., An Evaluation of Multiple-Disk I/O Systems, IEEE Transactions on Computers, vol. 38, No. 12, Dec. 1989, pp. 1680-1690.
Scheuermann, Peter, et al., Data Partitioning and Load Balancing in Parallel Disk Systems, The VLDB Journal, vol. 7, Springer-Verlag, Copyright Feb. 1998, 19 pages.
Schulze, Martin E., Considerations in the Design of a RAID Prototype, Computer Science Division, Department of Electrical Engineering and Computer Sciences, Univ. of CA, Berkley, Aug. 25, 1988.
Schulze, Martin., et al., How Reliable is a RAID?, Proceedings of COMPCON, 1989, pp. 118-123.
Shirriff, Kenneth W., Sawmill:A Logging File System for a High-Performance RAID Disk Array, CSD-95-862, Jan. 1995.
Stanek, William R., Microsoft Windows 2000 Server: Administering Volume Sets and RAID Arrays, Jan. 10, 2006, (Printed 1999), (http://www.microsoft.com/technet/prodtechnol/windows2000serv/maintain/operate/11w2kada.mspx).
Stodolsky, Daniel, et al., Parity Logging Overcoming the Small Write Problem in Redundant Disk Array, School of Computer Science and Department of Electrical and Computer Engineering, Carnegie Mellon University, IEEE, May 1993, 12 pages.
Stonebraker, Michael, et al., The Design of XPRS, Proceedings of the 14th VLDB Conference, LA, CA (1988).
Tanabe, Takaya, et al, Redundant Optical Storage System Using DVD-RAM Library, IEEE Symposium on Mass Storage, pp. 80-87, Mar. 1999.
Tekram—"About RAID 6".
Tweten, David, Hiding Mass Storage Under UNIX: NASA's MSS-H Architecture, IEEE Symposium on Mass Storage, pp. 140-145, May 1990.
Weikum, Gerhard, et al., Dynamic File Allocation in Disk Arrays, ETH Zurich, Department of Computer Science Information Systems—Databases, ACM SIGMOD Record, vol. 20, Issue 2, Jun. 1991, 10 pages.
Wilkes, John, et al., The HP AutoRAID hierarchical storage system, ACM Transactions on Computer Systems, Feb. 1996, vol. 14, pp. 108-136.
PCT Notification of Transmittal of the International Search Report and the Written Opinion of the International Searching Authority, or the Declaration, International Application No. PCT/US2006/047647, International Filing Date: Dec. 14, 2006: Date of Mailing: Mar. 3, 2009, 15 pages.
Chin-Shing Tau et al. "Efficient Parity Placement Schemes for Tolerating Triple Disk Failures in RAID Architectures" Proc. 17th Int Conf on Advanced Information Networking and Applications. Mar. 27, 2003; 6 pages.
Mario Blaum "A Family of MDS Array Codes with Minimal Number of Encoding Operations" Information Theory, 2006 IEEE International Symposium on, IEEE, PI; Jul. 1, 2006, pp. 2784-2788.].
Huang, Cheng "Efficient and Effective Schemes for Streaming Media Delivery," Washington University: Server Institute of Technology, Department of Computer Science, Aug. 2005, p. 1-104.
Huysing-Solles, H., PCT Notification of Transmittal of the International Search Report and the Written Opinion of the International Searching Authority, or the Declaration, International Appl. No. PCT/US2010/002600, filed Sep. 23, 2010, document dated Feb. 16, 2011, 10 pages, European Patent Office, Rijswijk, Netherlands.

* cited by examiner

TRIPLE PARITY TECHNIQUE FOR ENABLING EFFICIENT RECOVERY FROM TRIPLE FAILURES IN A STORAGE ARRAY

CROSS-REFERENCE TO RELATED APPLICATIONS

The present application is a continuation of U.S. patent application Ser. No. 11/304,369, now issued as U.S. Pat. No. 7,640,484, filed on Dec. 15, 2005, which is a continuation-in-part of U.S. patent application Ser. No. 10/035,607, which was filed on Dec. 28, 2001, by Peter F. Corbett for a ROW-DIAGONAL PARITY TECHNIQUE FOR ENABLING EFFICIENT RECOVERY FROM DOUBLE FAILURES IN A STORAGE ARRAY, now issued as U.S. Pat. No. 6,993,701 on Jan. 31, 2006, which is hereby incorporated by reference.

The present application is also related to the following U.S. Patents:

U.S. Pat. No. 7,613,984, issued on Nov. 3, 2009 for System and Method for Symmetric Triple Parity for Failing Storage Devices, by Goel et al.;

U.S. Pat. No. 7,409,625, issued on Aug. 5, 2008 for Row-Diagonal Parity Technique for Enabling Efficient Recovery from Double Failures in a Storage Array, by Corbett et al.; and U.S. Pat. No. 7,203,892, issued on Apr. 10, 2007 for Row-Diagonal Parity Technique for Enabling Efficient Recovery from Double Failures in a Storage Array, by Corbett, et al., all of which are incorporated herein by reference.

FIELD OF THE INVENTION

The present invention relates to arrays of storage systems and, more specifically, to a technique for efficiently reconstructing any combination of three failing storage devices of a storage array.

BACKGROUND OF THE INVENTION

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. The storage devices are typically disk drives, wherein the term "disk" commonly describes a self-contained rotating magnetic media storage device. The term "disk" in this context is synonymous with hard disk drive (HDD) or direct access storage device (DASD).

The disks within a storage system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information with respect to the striped data. The redundant information enables recovery of data lost when a storage device fails.

In the operation of a disk array, it is anticipated that a disk can fail. A goal of a high performance storage system is to make the mean time to data loss (MTTDL) as long as possible, preferably much longer than the expected service life of the system. Data can be lost when one or more disks fail, making it impossible to recover data from the device. Typical schemes to avoid loss of data include mirroring, backup and parity protection. Mirroring is an expensive solution in terms of consumption of storage resources, such as disks. Backup does not protect data modified since the backup was created. Parity schemes are common because they provide a redundant encoding of the data that allows for a single erasure (loss of one disk) with the addition of just one disk drive to the system.

Parity protection is used in computer systems to protect against loss of data on a storage device, such as a disk. A parity value may be computed by summing (usually modulo 2) data of a particular word size (usually one bit) across a number of similar disks holding different data and then storing the results on an additional similar disk. That is, parity may be computed on vectors 1-bit wide, composed of bits in corresponding positions on each of the disks. When computed on vectors 1-bit wide, the parity can be either the computed sum or its complement; these are referred to as even and odd parity respectively. Addition and subtraction on 1-bit vectors are both equivalent to exclusive-OR (XOR) logical operations. The data is then protected against the loss of any one of the disks, or of any portion of the data on any one of the disks. If the disk storing the parity is lost, the parity can be regenerated from the data. If one of the data disks is lost, the data can be regenerated by adding the contents of the surviving data disks together and then subtracting the result from the stored parity.

Typically, the disks are divided into parity groups, each of which comprises one or more data disks and a parity disk. A parity set is a set of blocks, including several data blocks and one parity block, where the parity block is the XOR of all the data blocks. A parity group is a set of disks from which one or more parity sets are selected. The disk space is divided into stripes, with each stripe containing one block from each disk. The blocks of a stripe are usually at the same locations on each disk in the parity group. Within a stripe, all but one block are blocks containing data ("data blocks") and one block is a block containing parity ("parity block") computed by the XOR of all the data. If the parity blocks are all stored on one disk, thereby providing a single disk that contains all (and only) parity information, a RAID-4 implementation is provided. If the parity blocks are contained within different disks in each stripe, usually in a rotating pattern, then the implementation is RAID-5. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

As used herein, the term "encoding" means the computation of a redundancy value over a predetermined subset of data blocks, whereas the term "decoding" means the reconstruction of a data or parity block by using a subset of data blocks and redundancy values. If one disk fails in the parity group, the contents of that disk can be decoded (reconstructed) on a spare disk or disks by adding all the contents of the remaining data blocks and subtracting the result from the parity block. Since two's complement addition and subtraction over 1-bit fields are both equivalent to XOR operations, this reconstruction consists of the XOR of all the surviving data and parity blocks. Similarly, if the parity disk is lost, it can be recomputed in the same way from the surviving data.

Parity schemes generally provide protection against a single disk failure within a parity group. These schemes can also protect against multiple disk failures as long as each failure occurs within a different parity group. However, if two disks fail concurrently within a parity group, then an unrecoverable loss of data is suffered. Failure of two disks concurrently within a parity group is a fairly common occurrence, particularly because disks "wear out" and because of environmental factors with respect to the operation of the disks. In this context, the failure of two disks concurrently within a parity group is referred to as a "double failure".

A double failure typically arises as a result of a failure of one disk and a subsequent failure of another disk while attempting to recover from the first failure. The recovery or reconstruction time is dependent upon the level of activity of the storage system. That is, during reconstruction of a failed disk, it is possible that the storage system remain "online" and continue to serve requests (from clients or users) to access (i.e., read and/or write) data. If the storage system is busy serving requests, the elapsed time for reconstruction increases. The reconstruction process time also increases as the size and number of disks in the storage system increases, as all of the surviving disks must be read to reconstruct the lost data. Moreover, the double disk failure rate is proportional to the square of the number of disks in a parity group. However, having small parity groups is expensive, as each parity group requires an entire disk devoted to redundant data.

Another failure mode of disks is media read errors, wherein a single block or sector of a disk cannot be read. The unreadable data can be reconstructed if parity is maintained in the storage array. However, if one disk has already failed, then a media read error on another disk in the array will result in lost data. This is a second form of double failure.

It can easily be shown that the minimum amount of redundant information required to correct a double failure is two units. Therefore, the minimum number of parity disks that can be added to the data disks is two. This is true whether the parity is distributed across the disks or concentrated on the two additional disks.

A known double failure correcting parity scheme is an EVENODD XOR-based technique that allows a serial reconstruction of lost (failed) disks. EVENODD parity requires exactly two disks worth of redundant data, which is optimal. According to this parity technique, all disk blocks belong to two parity sets, one a typical RAID-4 style XOR computed across all the data disks and the other computed along a set of diagonally adjacent disk blocks. The diagonal parity sets contain blocks from all but one of the data disks. For n data disks, there are n−1 rows of blocks in a stripe. Each block is on one diagonal and there are n diagonals, each n−1 blocks in length. Notably, the EVENODD scheme only works if n is a prime number. The EVENODD technique is disclosed in an article of IEEE Transactions on Computers, Vol. 44, No. 2, titled *EVENODD: An Efficient Scheme for Tolerating Double Disk Failures in RAID Architectures*, by Blaum et al, February, 1995. A variant of EVENODD is disclosed in U.S. Pat. No. 5,579,475, titled METHOD AND MEANS FOR ENCODING AND REBUILDING THE DATA CONTENTS OF UP TO TWO UNAVAILABLE DASDS IN A DASD ARRAY USING SIMPLE NON-RECURSIVE DIAGONAL AND ROW PARITY, by Blaum, et al., issued on Nov. 26, 1996. The above-mentioned article and patent are hereby incorporated by reference as though fully set forth herein.

The EVENODD technique utilizes a total of p+2 disks, where p is a prime number and p disks contain data, with the remaining two disks containing parity information. One of the parity disks contains row parity blocks. Row parity is calculated as the XOR of all the data blocks that are at the same position in each of the data disks. The other parity disk contains diagonal parity blocks. Diagonal parity is constructed from p−1 data blocks that are arranged in a diagonal pattern on the data disks. The blocks are grouped into stripes of p−1 rows. This does not affect the assignment of data blocks to row parity sets. However, diagonals are constructed in a pattern such that all of their blocks are in the same stripe of blocks. This means that most diagonals "wrap around" within the stripe, as they go from disk to disk.

Specifically, in an array of n×(n−1) data blocks, there are exactly n diagonals each of length n−1, if the diagonals "wrap around" at the edges of the array. The key to reconstruction of the EVENODD parity arrangement is that each diagonal parity set contains no information from one of the data disks. However, there is one more diagonal than there are blocks to store the parity blocks for the diagonals. That is, the EVENODD parity arrangement results in a diagonal parity set that does not have an independent parity block. To accommodate this extra "missing" parity block, the EVENODD arrangement XOR's the parity result of one distinguished diagonal into the parity blocks for each of the other diagonals.

FIG. 1 is a schematic block diagram of a prior art disk array 100 that is configured in accordance with the conventional EVENODD parity arrangement. Each data block Dab belongs to parity sets a and b, where the parity block for each parity set is denoted Pa. Note that for one distinguished diagonal (X), there is no corresponding parity block stored. This is where the EVENODD property arises. In order to allow reconstruction from two failures, each data disk must not contribute to at least one diagonal parity set. By employing a rectangular array of n×(n−1) data blocks, the diagonal parity sets have n−1 data block members. Yet, as noted, such an arrangement does not have a location for storing the parity block for all the diagonals. Therefore, the parity of the extra (missing) diagonal parity block (X) is recorded by XOR'ing that diagonal parity into the parity of each of the other diagonal parity blocks. Specifically, the parity of the missing diagonal parity set is XOR'd into each of the diagonal parity blocks P4 through P7 such that those blocks are denoted P4X-P7X.

For reconstruction from the failure of two data disks, the parity of the diagonal that does not have a parity block is initially recomputed by XOR'ing all of the parity blocks. For example, the sum of all the row parities is the sum of all the data blocks. The sum of all the diagonal parities is the sum of all the data blocks minus the sum of the missing diagonal parity block. Therefore, the XOR of all parity blocks is equivalent to the sum of all the blocks (the row parity sum) minus the sum of all the blocks except the missing diagonal, which is just a parity of the missing diagonal. Actually, n−1 copies of the missing diagonal parity are added into the result, one for each diagonal parity block. Since n is a prime number greater than two, n−1 is even, resulting in the XOR of a block with itself an even number of times, which results in a zero block. Accordingly, the sum of the diagonal parity blocks with the additional missing parity added to each is equal to the sum of the diagonal parity blocks without the additional diagonal parity.

Next, the missing diagonal parity is subtracted from each of the diagonal parity blocks. After two data disks fail, there are at least two diagonal parity sets that are missing only one block. The missing blocks from each of those parity sets can be reconstructed, even if one of the sets is the diagonal for which there is not a parity block. Once those blocks are reconstructed, all but one member of two of the row parity sets are available. This allows reconstruction of the missing members of those rows. This reconstruction occurs on other diagonals, which provides enough information to reconstruct the last missing blocks on those diagonals. The pattern of reconstructing alternately using row then diagonal parity continues until all missing blocks have been reconstructed.

Since n is prime, a cycle is not formed in the reconstruction until all diagonals have been encountered, hence all the missing data blocks have been reconstructed. If n were not prime, this would not be the case. If both parity disks are lost, a simple reconstruction of parity from data can be performed. If a data disk and the diagonal parity disk are lost, a simple RAID-4 style reconstruction of the data disk is performed using row parity followed by reconstruction of the diagonal parity disk. If a data disk and the row parity disk are lost, then one diagonal parity may be computed. Since all diagonals have the same parity, the missing block on each diagonal can subsequently be computed.

Since each data block is a member of a diagonal parity set, when two data disks are lost (a double failure), there are two parity sets that have lost only one member. Each disk has a diagonal parity set that is not represented on that disk. Accordingly, for a double failure, there are two parity sets that can be reconstructed. EVENODD also allows reconstruction from failures of both parity disks or from any combination of one data disk and one parity disk failure. The technique also allows reconstruction from any single disk failure.

Although the EVENODD technique is optimal in terms of the amount of parity information, the amount of computation required for both encoding and decoding is only asymptotically optimal. This is because of the extra computation required to add the missing diagonal parity into each of the diagonal parity blocks. That is, the p−1 blocks in a stripe are not enough to hold the p parity blocks generated from the p diagonals. To overcome this, the EVENODD technique requires that the parity of one of the diagonals be XOR'd into the parity blocks of all the other diagonals, thereby increasing computational overhead.

In general, all diagonal parity blocks must be updated for any small write operation to a data block along the diagonal that has no direct parity block. Extra computation is also needed for a large write operation. As used herein, a "large-write" operation involves rewriting of all the blocks of a stripe, whereas a "small-write" operation involves modification of at least one data block and its associated parity.

In certain storage environments, it is common to utilize a significant number of lower quality disk drives, such as, e.g., near line storage systems for use as short term storage before data is backed up to tape or other long-term archival systems. However, as the number of disks in an array increases, the probability that multiple failures will occur also increases. The probability is exacerbated by a lower mean time to failure (MTTF) of less expensive storage devices. Thus, it is possible to have storage systems experiencing triple failures, that is, the concurrent failures of three devices in the storage array. Furthermore, numerous storage protocols, such as Serial Attached SCSI (SAS), Fibre Channel (FC), etc., have resulted in increasingly complex architectures for disk shelves which has resulted in a concomitant increase in the number of failures experienced by disk shelves, which results in loss of access to each disk connected to a failed disk shelf.

One technique for correcting triple failures is an extension of the EVENODD technique termed the STAR technique, which is described in *Efficient and Effective Schemes for Streaming Media Delivery*, by Cheng Huang, dated August 2005, the contents of which is hereby incorporated by reference.

The STAR technique utilizes an array of p+3 disks, wherein p is a prime number, and utilizes the EVENODD encoding scheme to encode both a diagonal parity set and an anti-diagonal parity set so that there are p disks of data, a row parity disk, a diagonal parity disk and an anti-diagonal parity disk. An anti-diagonal parity set is computed similarly to the diagonal parity set but utilizing a slope of −1, as opposed to the diagonal parity set, which uses a slope of 1.

One noted disadvantage of the STAR technique is its use of the EVENODD encoding technique. Effectively, STAR encodes the array once using EVENODD to generate the row and diagonal parity and then performs a second parity calculation, using EVENODD encoding, to generate the anti-diagonal parity. The disadvantages of the EVENODD technique are exacerbated by the need to perform extra computations to update both the diagonal and anti-diagonal parity sets when writing a data block.

A further noted disadvantage with the STAR technique is that its reconstruction process has a significantly higher complexity for arrays involving large prime numbers and/or arrays involved in worst case failure conditions. This significant higher complexity increases the number of computations required to perform a reconstruction operation.

SUMMARY OF THE INVENTION

The present invention comprises a triple parity (TP) technique that reduces the overhead of computing parity for a storage array adapted to enable efficient recovery from the concurrent failure of up to three storage devices in the array. The TP technique is preferably used in an array comprising a number n of storage devices, such as disks, including data disks, a row parity disk, a diagonal parity disk and an anti-diagonal parity disk, wherein n=p+2 with p being a prime number. The disks are divided into blocks and the blocks are organized into stripes, wherein each stripe comprises n−3 (or p−1) rows. The blocks of the rows selected to form a stripe are typically contiguous on each disk, although this is not a requirement of the invention. The diagonal parity disk stores parity information computed along diagonal parity sets ("diagonals") of the array. The blocks in a stripe are organized into n−2 diagonals, each of which contains n−3 blocks from the data and row parity disks, and all but one of which stores its parity in a block on the diagonal parity disk. Similarly, the anti-diagonal parity disk stores parity information computed along anti-diagonal parity sets ("anti-diagonals") of the array. Notably, the anti-diagonals have a slope that is orthogonal to the diagonals. As a result, the novel TP technique provides a uniform stripe depth and an amount of parity information equal to three disks worth, which is the minimum amount required to reconstruct from any three disk failures.

In accordance with the invention, the TP technique involves computation of row parity across each of the rows of data disks in the array, and thereafter does not distinguish between the row parity and data blocks when computing the diagonal and anti-diagonal parity stored on the (anti-)diagonal parity disks. That is, the (anti-)diagonal parities are computed along (anti-)diagonals that collectively span all the data disks and the row parity disk. Moreover, the parity for all of the (anti-)diagonals except one is stored on the (anti-) diagonal parity disk. In other words, the (anti-)diagonal parity disk contains parity blocks for each of the (anti-)diagonals of a stripe except one. Yet, even though the parity for one of the (anti-)diagonals is not stored or computed, the inventive technique provides sufficient parity information to recover from any three concurrent disk failures in the array.

In response to one or more storage device failures within the array, the present invention illustratively provides a multi-step state machine implemented within a disk storage layer (RAID system) of a storage operating system for determining an appropriate reconstruction technique. For purposes of the invention, the data disks and the row parity disk are collectively termed "RAID 4 disks." If a single data disk fails, then the missing blocks from the failed disk are reconstructed using a conventional row parity technique. If the (anti-)diagonal parity disk fails, the appropriate (anti-)diagonal parity is recomputed using the data disks and the row parity disk. If a double RAID 4 disk failure occurs, data may be reconstructed in accordance with a row-diagonal (R-D) parity recovery technique, using either the diagonal parity or the anti-diagonal parity.

If a triple disk failure occurs, a determination is made as to which disks have failed. If one RAID 4 disk as well as the diagonal and anti-diagonal disks fail, then the failed (missing) RAID 4 disk is recovered using the conventional row parity technique before recomputing the missing diagonal and anti-diagonal parity. If two RAID 4 disks and one (anti-)diagonal disk fail, then the R-D parity technique is employed to recover the missing RAID 4 disks before recomputing the missing diagonal or anti-diagonal parity.

However, if three RAID 4 disks fail, then a triple parity recovery technique is invoked by first computing the "dropped" diagonal and anti-diagonal parity, i.e., the diagonal and anti-diagonal parity blocks that were not previously stored. The RAID system then computes a total of p 4-tuple sums along an intermediate (i.e., middle) disk of the failed disks by generating a number of crosses. The 4-tuple sums are thereafter reduced to a total of p−1 pairwise sums on the middle disk. The generated pairwise sums form a solvable system of linear equations. Illustratively, the data on the middle disk is first recovered by solving the system of equations. Once a first block on the middle disk has been resolved, its solution may be substituted into other equations until all blocks on the middle disk have been recovered. Once the middle disk has been recovered, the system performs the R-D parity technique to recover the remaining two disks.

Advantageously, the inventive technique minimizes the computation load to compute parity stored in the array during failure-free operation. The technique also minimizes the overhead of parity computation, and requires less computation compared to conventional schemes, such as STAR, for a given number of data disks. In addition, since the invention may be implemented using a concentrated parity technique, where row parity blocks are all stored on the same disk, data disks may be incrementally added to the array without reformatting or recalculating the existing parity information. The only restriction to the addition of data disks to the array is that the maximum number of disks that can be used in the array must be decided beforehand (a priori). This restriction is due to the use of (anti-)diagonals and their lengths depending upon the stripe depth. The difference between the number of actual disks present and the maximum number of disks in the array is illustratively filled with "imaginary" disks that contain only zero-valued data.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF THE ILLUSTRATIVE EMBODIMENTS

A. Storage System Environment

Figure 1:
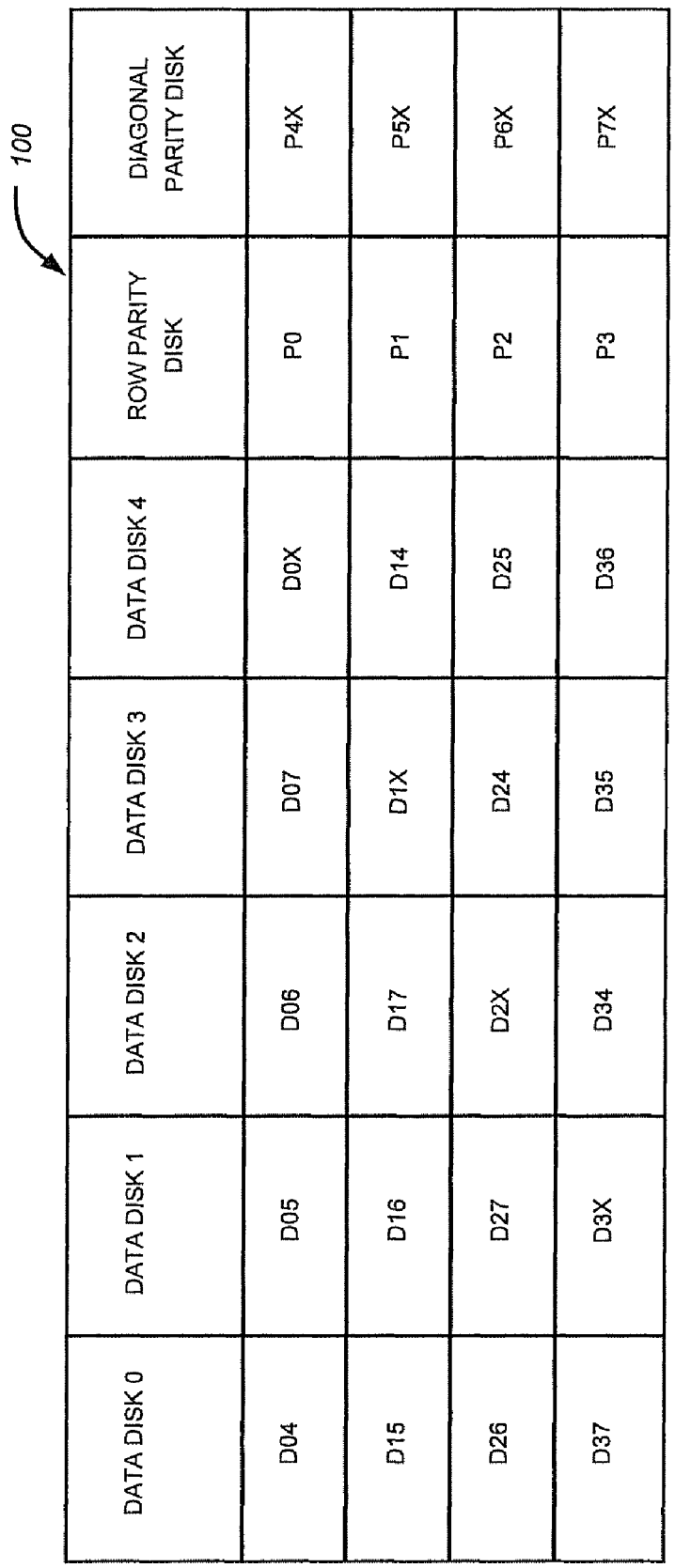
FIG. 1 is a schematic block diagram of a prior art disk array that is configured in accordance with a conventional EVENODD parity arrangement.
Figure 2:
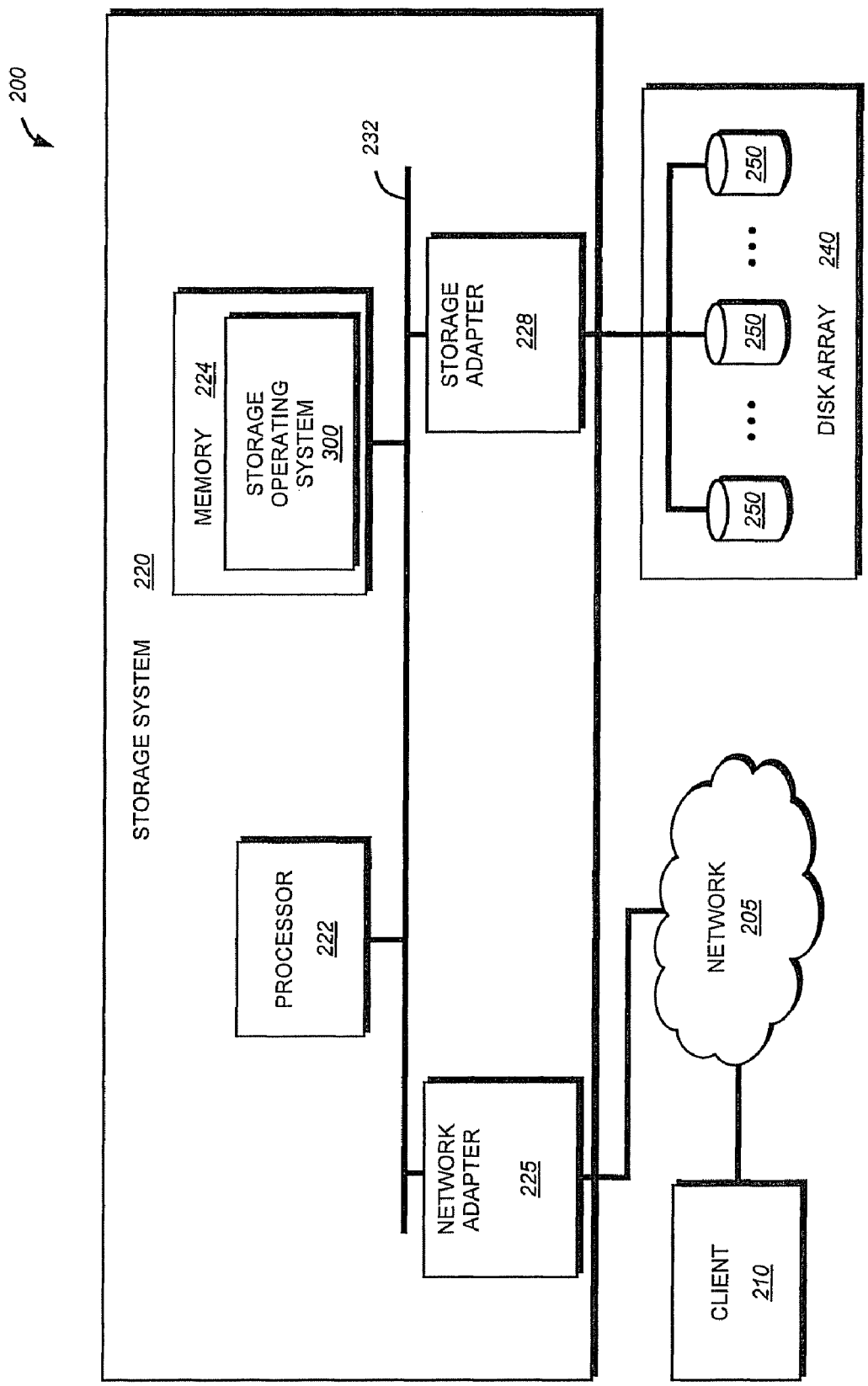
FIG. 2 is a schematic block diagram of an environment including a storage system in accordance with an embodiment of the present invention.

FIG. 2 is a schematic block diagram of an environment 200 including a storage system 220 that may be advantageously used with the present invention. The inventive technique described herein may apply to any type of special-purpose (e.g., file server or filer) or general-purpose computer, including a standalone computer or portion thereof, embodied as or including a storage system 220. Moreover, the teachings of this invention can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

In the illustrative embodiment, the storage system 220 comprises a processor 222, a memory 224, a network adapter 225 and a storage adapter 228 interconnected by a system bus 232. The memory 224 comprises storage locations that are addressable by the processor and adapters for storing software program code and data structures associated with the present invention. The processor and adapters may, in turn, comprise processing elements and/or logic circuitry configured to execute the software code and manipulate the data structures. A storage operating system 300, portions of which are typically resident in memory and executed by the processing elements, functionally organizes the system 220 by, inter alia, invoking storage operations executed by the storage system. It will be apparent to those skilled in the art that other processing and memory means, including various computer readable media, may be used for storing and executing program instructions pertaining to the inventive technique described herein.

The network adapter 225 comprises a plurality of ports adapted to couple the storage system 220 to one or more clients 210 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the network 205 may be embodied as an Ethernet network or a Fibre Channel (FC) network. Each client 210 may communicate with the storage system 220 over network 205 by exchanging discrete frames or packets of data according to pre-defined protocols, such as TCP/IP.

The storage adapter 228 cooperates with the storage operating system 300 executing on the system 220 to access information requested by a user (or client). The information may be stored on any type of attached array of writeable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 250, such as HDD and/or DASD, of array 240. The storage adapter includes input/output (I/O) interface circuitry that couples to the disks over an I/O interconnect arrangement, such as a conventional high-performance, FC serial link topology.

Storage of information on array 240 is preferably implemented as one or more storage "volumes" that comprise a cluster of physical storage disks 250, defining an overall logical arrangement of disk space. Each volume is generally, although not necessarily, associated with its own file system. The disks within a volume/file system are typically organized as one or more groups, wherein each group is operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of parity information with respect to the striped data.

The present invention comprises a "triple" parity (TP) technique that provides triple failure parity correcting recovery using row, diagonal and anti-diagonal parity in a disk array. The inventive technique is preferably implemented by a disk storage layer (shown at 340 of FIG. 3) of the storage operating system 300 to provide a method and system for constructing parity in stripes across multiple storage devices, such as disks, in a storage system. Three disks of the array are devoted entirely to parity while the remaining disks hold data. The data on the data disks is stored "in the clear", meaning it is not further encoded for storage. The contents of the array can be reconstructed entirely, without loss of data, after any one, two or three concurrent disk failures. The invention reduces the amount of computation of parity information that is required compared to previously known schemes, while also reducing the computation to recover from three disk failures. In addition, the invention provides a uniform stripe depth (each disk contains the same number of blocks per stripe) and an amount of parity information equal to three disks worth, which is the minimum amount required to allow reconstruction from any three disk failures.

Broadly stated, the invention comprises n storage devices, where n=p+2 and p is a prime number. The storage devices are divided into blocks, where the blocks are the same size. Within each device, n−3 blocks are arbitrarily selected and grouped to form a stripe across all the devices. Within the stripe, one device is designated to hold parity formed by selecting blocks from the other devices as input. This device is called a diagonal parity device and the parity it holds is called diagonal parity, as a result of the simplified construction technique described further herein. Similarly, in each stripe, one device is designated to hold parity as an anti-diagonal parity device and the parity it holds is called anti-diagonal parity. Illustratively, the diagonal and anti-diagonal parity have orthogonal slopes across the array, for example the diagonal parity has a slope of 1 whereas the anti-diagonal parity has a slope of −1. Within each stripe, one block is selected from each of the devices that are not the (anti-)diagonal parity devices in that stripe. This set of blocks is called a row. One block in the row is selected to hold parity for the row (row parity), and the remaining blocks hold data. The formulation of rows is continued until all blocks in the stripe that are not in the diagonal and anti-diagonal parity device are assigned to exactly one row. There are a total of n−3 rows.

Within each stripe, one block is selected from each of all but one of the devices that are not the diagonal or anti-diagonal parity device in that stripe, with the further restriction that no two of the selected blocks belong to the same row. This is called a diagonal parity set or "diagonal". A diagonal may be formed, for example, by numbering the data, row parity and diagonal parity devices from 0 to n−2, numbering the rows from 0 to n−3, and then assigning the block at device i, row j to diagonal (i+j)mod(n−2). The formation of diagonals continues until all blocks that are not on the diagonal and anti-diagonal parity devices in the stripe are assigned to diagonals, with the further restriction that no two diagonals exclude all blocks from the same device. There are n−2 diagonals. Of the n−2 diagonals, n−3 diagonals are selected. The blocks in those diagonals, whether they hold data or parity, are combined to form a diagonal parity block. The n−3 diagonal parity blocks are stored in arbitrary order in the n−3 blocks in the stripe that reside on the device that holds diagonal parity in that stripe. A similar technique is utilized to assign parity and blocks to anti-diagonal parity sets or "anti-diagonals." The formation of anti-diagonals continues until all blocks that are not on the anti-diagonal parity and diagonal devices in the stripe are assigned to anti-diagonals, with the further restriction that no two anti-diagonals excludes all blocks from the same device. An anti-diagonal may be formed, for example, by numbering the data, row parity and anti-diagonal parity devices from 0 to n−2, numbering the rows from 0 to n−3, and then assigning the block at device i, row j to diagonal (n−3−i+j)mod(n−2).

The invention can be implemented simply by selecting rows that contain blocks that are in the same position in each disk, selecting contiguous groups of n−3 rows to form stripes, and further selecting blocks within the stripe such that an (anti-)diagonal pattern with wraparound is formed by the blocks in each (anti-)diagonal. In addition, the invention can be implemented by storing all the row parity blocks in a stripe in the same device in the stripe. In a preferred embodiment, the invention can be implemented by keeping the same use of devices as row parity, (anti-)diagonal parity or data devices from stripe to stripe. Alternatively, another preferred embodiment of the invention is to rotate or otherwise vary the use of the devices as row parity, (anti-)diagonal parity or data devices from stripe to stripe.

Parity is generally calculated as an exclusive-OR (XOR) of data blocks to form a parity block. The XOR operation is generally performed over the same 1-bit field in each input block to produce a single corresponding bit of output. As noted, the XOR operation is equivalent to two's complement addition or subtraction of two 1-bit fields. Redundant parity information may also be computed as the sum of same-sized multi-bit fields (e.g., 8, 16, 32, 64, 128 bits) in all the inputs. For example, the equivalent of parity may be computed by adding data using two's complement addition on 32-bit fields to produce each 32 bits of redundant information. This is only the case assuming non-reliance on the fact that an XOR operation directed to the same input twice into a block produces the original content of the block, as the XOR of a block with itself produces zero.

It will be apparent to those skilled in the art that a block (for purposes of parity computation) may or may not correspond to a file block, a database block, a disk sector or any other conveniently sized unit. There is no requirement that the block size used for parity computation have any relation to any other block sizes used in the system. However, it is expected that one or more integer number of parity blocks will fit into a unit defined to be one or more integer number of disk sectors. In many cases, some number of blocks will correspond to file system or database blocks, and will typically be of size 4 k (4096) bytes or some higher power of two bytes (e.g., 8 k, 16 k, 32 k, 64 k, 128 k, 256 k).

The illustrative system described herein preferably performs full stripe write operations. In particular, individual file blocks that are typically 4 k or 8 k bytes may be divided into smaller blocks used only for parity computation, so that full stripes of, e.g., 4 k byte sized blocks can be written to the disks of the array. When full stripes are written to disk, all parity computations may be performed in memory before the results are written to disk, thus reducing the burden of computing and updating parity on disk.

B. Storage Operating System

To facilitate access to the disks, the storage operating system 300 implements a write-anywhere file system that cooperates with virtualization modules to provide a function that "virtualizes" the storage space provided by disks. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN system approach to storage by enabling file-based (NAS) access to the files and directories, while further enabling block-based (SAN) access to the vdisks on a file-based storage platform.

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "ONTAP" is employed, it should be taken broadly to refer to any storage operating system that is otherwise adaptable to the teachings of this invention.

As used herein, the term "storage operating system" generally refers to the computer-executable code operable on a computer that manages data access and may, in the case of a storage system, implement data access semantics, such as the Data ONTAP® storage operating system, which is implemented as a microkernel. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
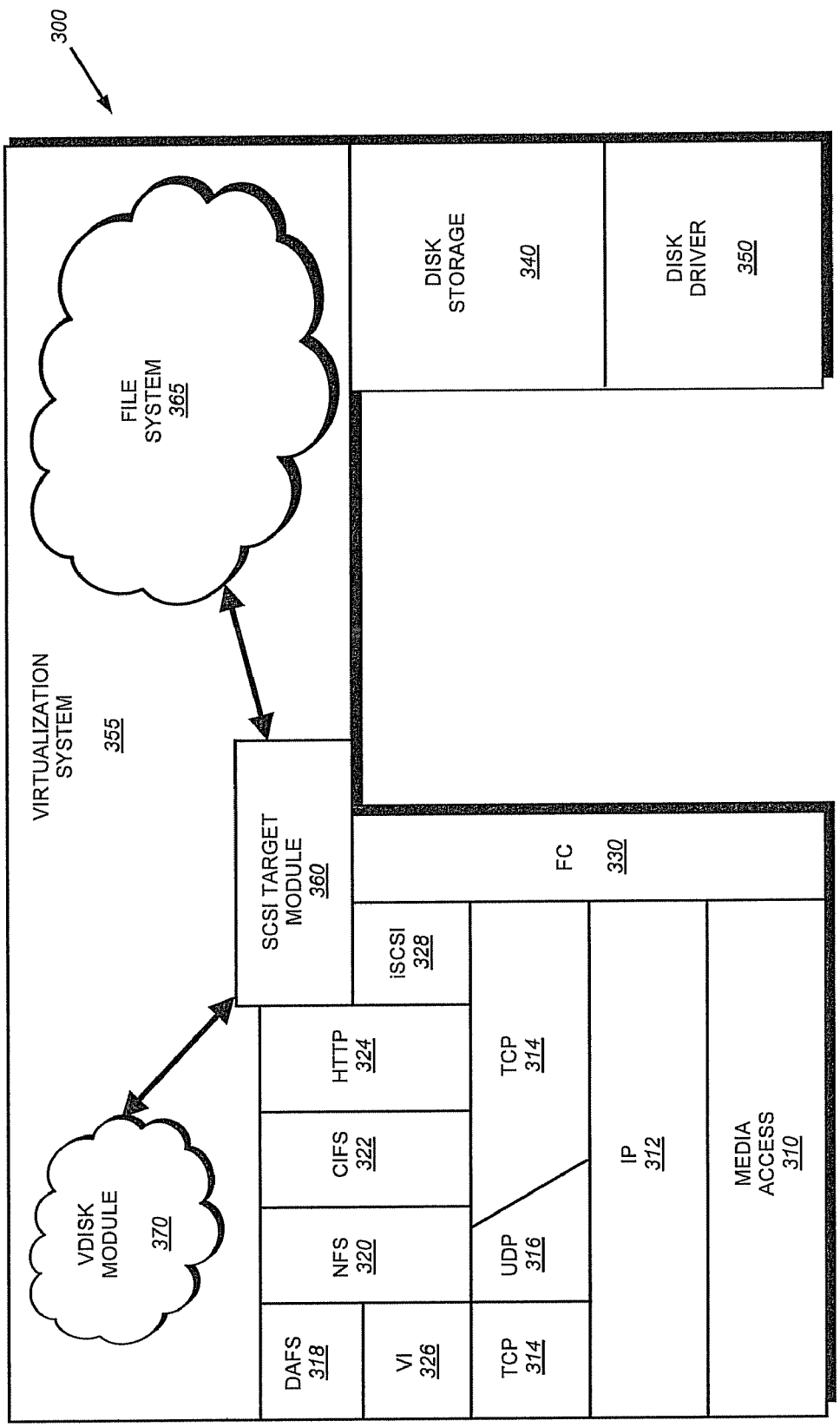
FIG. 3 is a schematic block diagram of an exemplary storage operating system for use on the storage system of FIG. 2 in accordance with an embodiment of the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine that provides data paths for clients to access information stored on the multi-protocol storage system using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the DAFS protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318.

An iSCSI driver layer 328 provides block protocol access over the TCP/IP network protocol layers, while a FC driver layer 330 operates with the network adapter to receive and transmit block access requests and responses to and from the storage system. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage system. In addition, the storage operating system includes a disk storage layer 340, such as a RAID system, that implements a disk storage protocol, such as a RAID protocol, and a disk driver layer 350 that implements a disk access protocol such as, e.g., a SCSI protocol.

In the illustrative embodiment of the present invention, the disk storage layer (e.g., RAID system 340) implements the novel TP technique. Illustratively, during write operations, the RAID system 340 encodes data according to an encoding technique described below and, in response to the detection of one or more failures of storage devices, executes the novel reconstruction technique, also described further below. It should be noted that in alternate embodiments, the novel TP technique may be implemented by modules of the storage operating system other than the RAID system 340. As such, the description of the RAID system 340 implementing the novel TP technique should be taken as exemplary only.

Bridging the disk software layers with the integrated network protocol stack layers is a virtualization system 355 that is implemented by a file system 365 interacting with virtualization modules illustratively embodied as, e.g., vdisk module 370 and SCSI target module 360. It should be noted that the vdisk module 370, the file system 365 and SCSI target module 360 can be implemented in software, hardware, firmware, or a combination thereof. The vdisk module 370 interacts with the file system 365 to enable access by administrative interfaces in response to a system administrator issuing commands to the multi-protocol storage system 220. In essence, the vdisk module 370 manages SAN deployments by, among other things, implementing a comprehensive set of vdisk (lun) commands issued through a user interface by a system administrator. These vdisk commands are converted to primitive file system operations ("primitives") that interact with the file system 365 and the SCSI target module 360 to implement the vdisks.

The SCSI target module 360, in turn, initiates emulation of a disk or lun by providing a mapping procedure that translates luns into the special vdisk file types. The SCSI target module is illustratively disposed between the FC and iSCSI drivers 330, 328 and the file system 365 to thereby provide a translation layer of the virtualization system 355 between the SAN block (lun) space and the file system space, where luns are represented as vdisks. By "disposing" SAN virtualization over the file system 365, the multi-protocol storage system reverses the approaches taken by prior systems to thereby provide a single unified storage platform for essentially all storage access protocols.

The file system 365 is illustratively a message-based system; as such, the SCSI target module 360 transposes a SCSI request into a message representing an operation directed to the file system. For example, the message generated by the SCSI target module may include a type of operation (e.g., read, write) along with a pathname (e.g., a path descriptor) and a filename (e.g., a special filename) of the vdisk object represented in the file system. The SCSI target module 360 passes the message into the file system 365 as, e.g., a function call, where the operation is performed.

The file system 365 illustratively implements the WAFL file system having an on-disk format representation that is block-based using, e.g., 4 kilobyte (KB) blocks and using inodes to describe the files. The WAFL file system uses files to store metadata describing the layout of its file system; these metadata files include, among others, an inode file. A file handle, i.e., an identifier that includes an inode number, is used to retrieve an inode from disk. A description of the structure of the file system, including on-disk inodes and the inode file, is provided in the U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al.

Operationally, a request from the client 210 is forwarded as a packet over the computer network 205 and onto the storage system 220 where it is received at the network adapter 225. A network driver processes the packet and, if appropriate, passes it on to a network protocol and file access layer for additional processing prior to forwarding to the write-anywhere file system 365. Here, the file system generates operations to load (retrieve) the requested data from disk 250 if it is not resident "in-core," i.e., in the memory 224. If the information is not in the memory, the file system 365 indexes into the inode file using the inode number to access an appropriate entry and retrieve a logical volume block number (vbn). The file system then passes a message structure including the logical vbn to the RAID system 340; the logical vbn is mapped to a disk identifier and disk block number (disk,dbn) and sent to an appropriate driver (e.g., SCSI) of the disk driver system 350. The disk driver accesses the dbn from the specified disk 250 and loads the requested data block(s) in memory for processing by the storage system. Upon completion of the request, the storage system (and operating system) returns a reply to the client 210 over the network 205.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 220 in response to a request issued by client 210. Moreover, in another alternate embodiment of the invention, the processing elements of adapter 225, 228 may be configured to offload some or all of the packet processing and storage access operations, respectively, from processor 222, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows XP®, or as a general-purpose operating system with configurable functionality, which is configured for storage applications as described herein.

In addition, it will be understood to those skilled in the art that the inventive technique described herein may apply to any type of special-purpose (e.g., file server, filer or storage system) or general-purpose computer, including a standalone computer or portion thereof, embodied as or including a storage system 220. An example of a storage system that may be advantageously used with the present invention is described in U.S. Pat. No. 7,873,700, issued on Jan. 18, 2011, entitled, MULTI-PROTOCOL STORAGE APPLIANCE THAT PROVIDES INTEGRATED SUPPORT FOR FILE AND BLOCK ACCESS PROTOCOLS, by Brian Pawlowski, et al. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

C. Triple Parity Encoding

The present invention comprises a triple parity (TP) technique that reduces the overhead of computing parity for a storage array adapted to enable efficient recovery from the concurrent failure of up to three storage devices in the array. The TP technique is preferably used in an array comprising a number n of storage devices, such as disks, including data disks, a row parity disk, a diagonal parity disk and an anti-diagonal parity disk, wherein n=p+2 with p being a prime number. The disks are divided into blocks and the blocks are organized into stripes, wherein each stripe comprises of n−3 (or p−1) rows. The blocks of the rows selected to form a stripe are typically contiguous on each disk, although this is not a requirement of the invention. The diagonal parity disk stores parity information computed along diagonal parity sets ("diagonals") of the array. The blocks in a stripe are organized into n−2 diagonals, each of which contains n−3 blocks from the data and row parity disks, and all but one of which stores its parity in a block on the diagonal parity disk. Similarly, the anti-diagonal parity disk stores parity information computed along anti-diagonal parity sets ("anti-diagonals") of the array. Notably, the anti-diagonals have a slope that is orthogonal to the diagonals. As a result, the novel TP technique provides a uniform stripe depth and an amount of parity information equal to three disks worth, which is the minimum amount required to reconstruct from any three disk failures.

In accordance with the invention, the TP technique involves computation of row parity across each of the rows of data disks in the array, and thereafter does not distinguish between the row parity and data blocks when computing the (anti-)diagonal parity stored on the (anti-)diagonal parity disks. That is, the (anti-)diagonal parities are computed along (anti-)diagonals that collectively span all the data disks and the row parity disk. Moreover, the parity for all of the (anti-) diagonals except one is stored on the (anti-)diagonal parity disk. In other words, the (anti-)diagonal parity disk contains parity blocks for each of the (anti-)diagonals of a stripe except one. Yet, even though the parity for one of the (anti-)diagonals is not stored or computed, the inventive technique provides sufficient parity information to recover from any three concurrent disk failures in the array.

Figure 4:
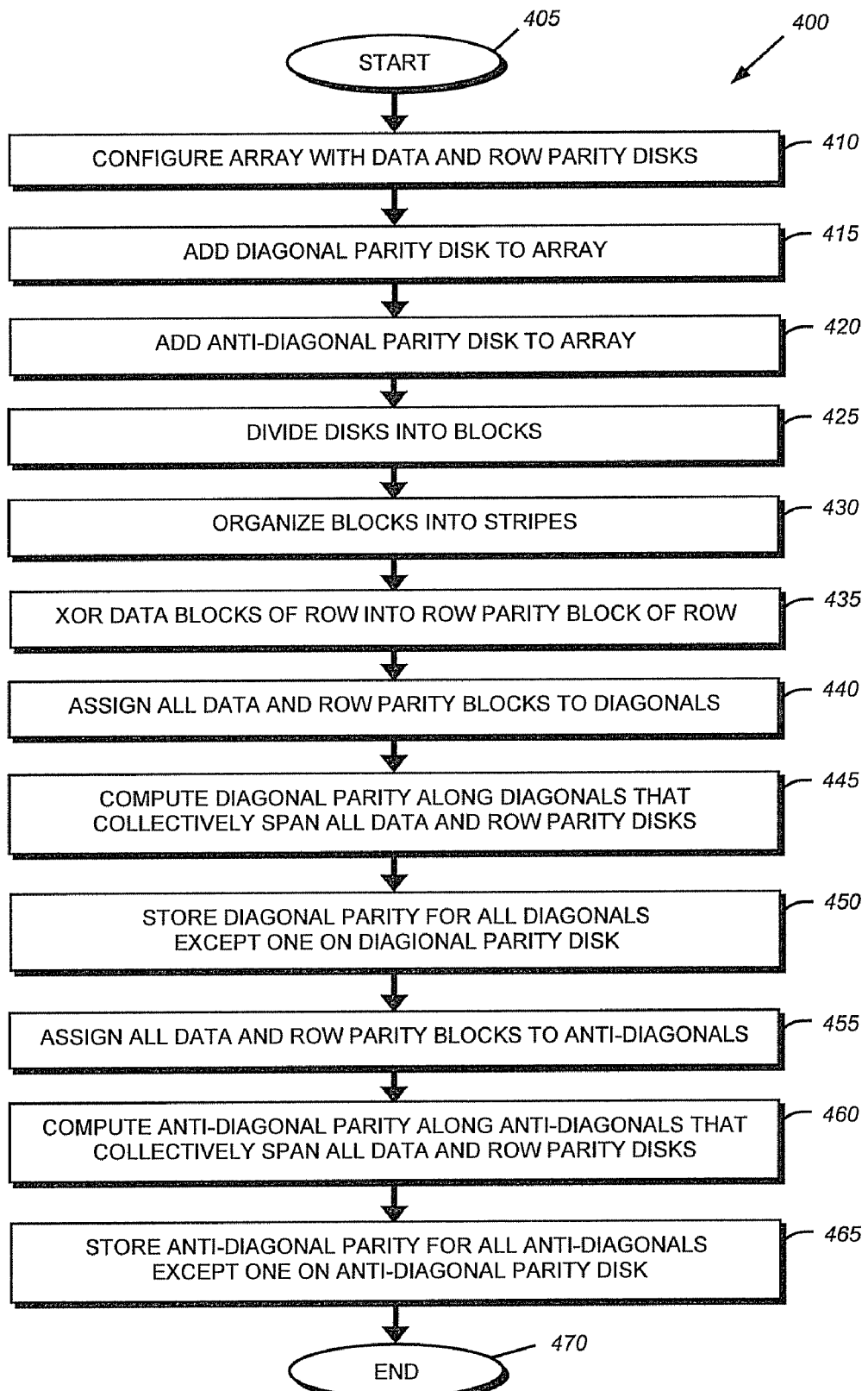
FIG. 4 is a flowchart detailing the steps of a procedure for encoding triple parity in accordance with an embodiment of the present invention.

FIG. 4 is a flowchart illustrating the steps of a procedure 400 for implementing the TP technique in accordance with an embodiment of the present invention. The procedure 400 starts in step 405 and proceeds to step 410 where an array is initially configured with a number of storage devices, such as disks, equal to a prime number p. The p disks represent data disks and a row parity disk. In step 415, an additional diagonal parity disk is included such that the entire array consists of p+1 disks. As described herein, the diagonal parity disk stores diagonal parity that is computed by defining diagonals that collectively span all the data disks and the row parity disk of the array. At this point, the array therefore comprises p–1 data disks, one row parity disk and one diagonal parity disk. In step 420, an anti-diagonal parity disk is added to the array. Similar to the diagonal parity disk, the anti-diagonal parity disk stores anti-diagonal parity that is computed by defining anti-diagonals that collectively span all the data disks and the row parity disk of the array. Notably, the (anti-)diagonals are orthogonal to each other, e.g., having slopes ±1. The array therefore comprises p–1 data disks, one row parity disk, one diagonal parity disk and one anti-diagonal parity disk for a total of n=p+2 disks. In step 425, the disks are divided into blocks and, in step 430, the blocks are organized into stripes, wherein each stripe comprises n–3 rows of blocks (with n=p+2). In step 435, each data block of a row is XOR'd into a row parity block of the row containing the XOR of all data blocks at the same position on each data disk.

All of the data blocks and the row parity blocks are then assigned to diagonals in step 440. For an array containing p disks, the diagonals are contained within groups of p–1 rows of blocks. There are exactly p diagonals, wherein each diagonal contains one diagonal parity block comprising the XOR of exactly p–1 data and/or row parity blocks. The diagonals wrap around at the edges of the array, with each of the p diagonal sets excluding exactly one disk. Each diagonal must exclude a different disk. Within the set of p–1 rows, every disk block is on exactly one of the p diagonals. Table 1 illustrates an embodiment of an array for p=5 with the diagonals numbered from 0 to 4. The numbers in the table indicate the diagonal parity sets to which each block belongs.

TABLE 1

| 0 | 1 | 2 | 3 | 4 |
|---|---|---|---|---|
| 1 | 2 | 3 | 4 | 0 |

TABLE 1-continued

| 2 | 3 | 4 | 0 | 1 |
|---|---|---|---|---|
| 3 | 4 | 0 | 1 | 2 |

It should be noted that the positions of the columns can be permuted, as can the positions of the elements in each column, as long as no two blocks in a row belong to the same diagonal parity set, without changing the property that the array can be reconstructed from any two disk failures. Without loss of generality, it can be assumed that blocks are assigned to diagonal parity sets in a way that is substantially in accord with Table 1. Furthermore, membership of blocks in rows can be permuted.

As noted, the parity for the diagonal parity sets is stored on the diagonal parity disk. In accordance with the invention, the TP parity technique does not distinguish between the row parity and data blocks when computing the diagonal parity stored on the diagonal parity disk. In other words, all disks of the original array can be treated equivalently such that the information stored on any one of them can be recovered from the XOR sum of all the other disks in the row parity set. The diagonal parity disk thus stores diagonal parity computed along diagonal parity sets that collectively span all the data disks and the row parity disk of the array (step 445). It should be noted that the roles of the disks, e.g., data, row parity or diagonal parity disks, can be varied from stripe to stripe, allowing RAID-5 style distributed parity implementations.

However, there is insufficient space on the diagonal parity disk to hold all the parity information for the p diagonals defined on the p–1 rows. In particular there is only sufficient room for p–1 blocks of diagonal parity. Each data disk and the row parity disk contribute, at most, one block to a diagonal and no row contains two blocks, whether data or row parity, that are both members of the same diagonal. Although there are exactly p diagonals, within a stripe there are only p–1 diagonal parity blocks on the diagonal parity disk.

To overcome this, the diagonal parity for one of the diagonal parity sets is not stored on the diagonal parity disk (step 450). That is, the diagonal parity disk contains parity blocks for each of the diagonals of a stripe except one. The choice of which diagonal parity block not to store is arbitrary. Since that parity is not stored, it is also not computed. Yet even though the parity for one of the diagonals is not stored, the inventive technique provides sufficient parity information to recover from any three concurrent disk failures in the array by also utilizing the anti-diagonal parity. That is, the entire contents of a stripe can be reconstructed when any three of its disks are lost in accordance with a reconstruction aspect of the present invention.

Once the diagonal parity is computed and stored, the RAID system performs operations in step 455-465 (similar to those in steps 440-450) to compute and store the anti-diagonal parity. Thus, in step 455, all data and row parity blocks are assigned to anti-diagonals. As noted, the slope of anti-diagonals is –1, i.e., orthogonal to the slope of the diagonals. Table 2 illustrates an embodiment of an array for p=5 with the anti-diagonals numbered from 0 to 4. The numbers in the table indicate the anti-diagonal parity sets to which each block belongs.

TABLE 2

| 4 | 3 | 2 | 1 | 0 |
|---|---|---|---|---|
| 0 | 4 | 3 | 2 | 1 |
| 1 | 0 | 4 | 3 | 2 |
| 2 | 1 | 0 | 4 | 3 |

The anti-diagonal parity is then computed along all anti-diagonals that collectively span all data and row parity disks in step 460 and, in step 465, the anti-diagonal parity for all of the anti-diagonals except one is stored on the anti-diagonal parity disk. The procedure 400 then completes at step 470.

Figure 5:
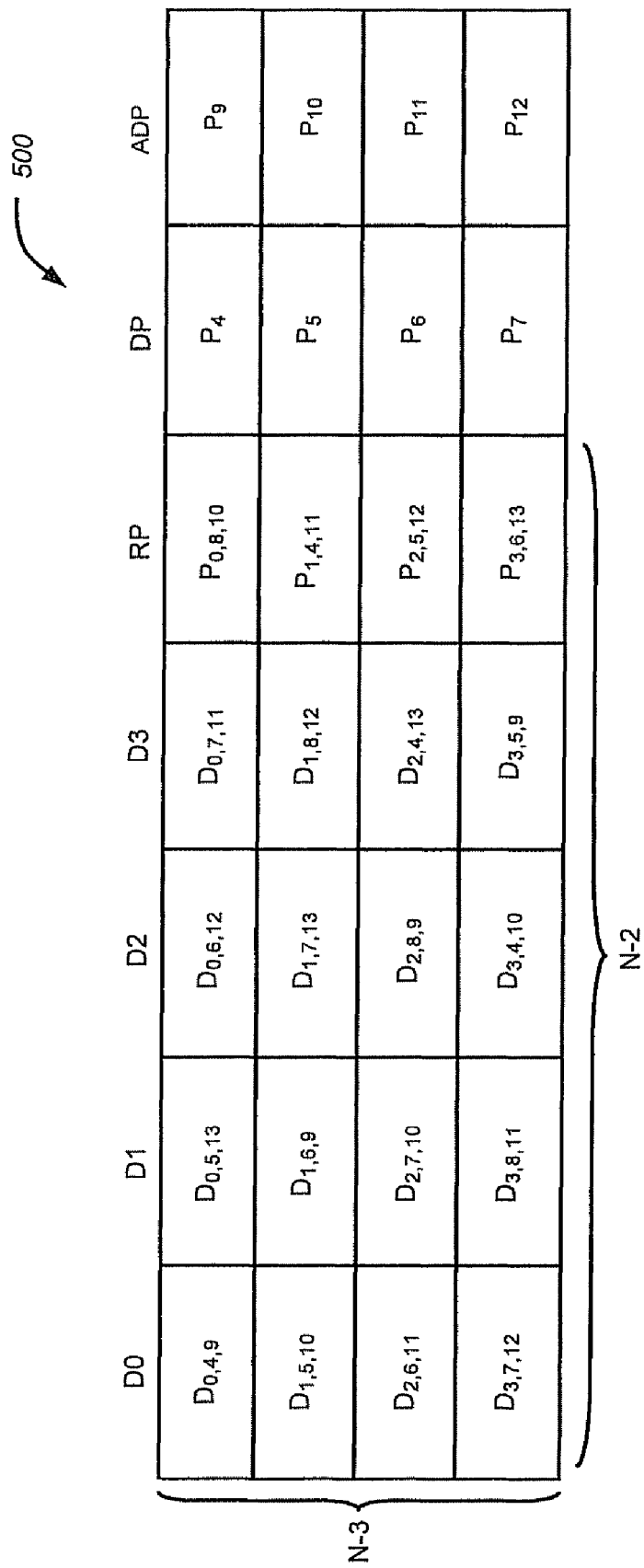
FIG. 5 is a block diagram of a disk array organized in accordance with an embodiment of the present invention.

FIG. 5 is a block diagram of a disk array 500 organized in accordance with the novel TP technique of the present invention. Assume n equals the number of disks in the array, where n=p+2. The first n−3 disks (D0-3) hold data, while disk n−2 (RP) holds row parity for the data disks D0-D3, disk n−1 (DP) holds diagonal parity and disk n (ADP) holds anti-diagonal parity. In the illustrative embodiment, the number of disks n in the array equals 7 (p=5). The disks are divided into blocks and the blocks are grouped into stripes, wherein each stripe equals n−3 (e.g., 4) rows. In addition, there are n−2 (e.g., 5) diagonals per stripe.

The data blocks and the row parity blocks are numbered such that each block belongs to a diagonal parity set and, within each row, each block belongs to a different diagonal parity set. The notation $D_{a,b,c}$ and $P_{a,b,c}$ denotes the respective contributions of data (D) and parity (P) blocks to specific row (a), diagonal (b) and anti-diagonal (c) parity computations. That is, the notation $D_{a,b,c}$ means that those data blocks belong to the row or diagonal used for purposes of computing row parity a, diagonal parity b and anti-diagonal parity c, and $P_{a,b,c}$ stores the parity for row parity set a and also contributes to diagonal parity set b and anti-diagonal parity c. For example, $P_{0,8,10}=D_{0,4,9} \oplus D_{0,5,13} \oplus D_{0,6,12} \oplus D_{0,7,11}$. The notation also includes the row parity block used for purposes of computing the diagonal parity for a particular diagonal, e.g., $P_4=D_{0,4,9} \oplus D_{3,4,10} \oplus D_{2,4,13} \oplus P_{1,4,11}$. Note that each of the diagonal parity blocks stored on the diagonal parity disk contains contributions from all but one of the other disks (including the row parity disk but excluding the anti-diagonal disk) of the array. For example, the diagonal parity block $P_4$ has contributions from D0 ($D_{0,4,9}$), D2 ($D_{3,4,10}$), D3 ($D_{2,4,13}$) and RP ($P_{1,4,11}$), but no contribution from D1. Note also that the diagonal parity for diagonal 8 ($P_8$) is neither computed nor is it stored on the diagonal parity disk DP.

Figure 6:
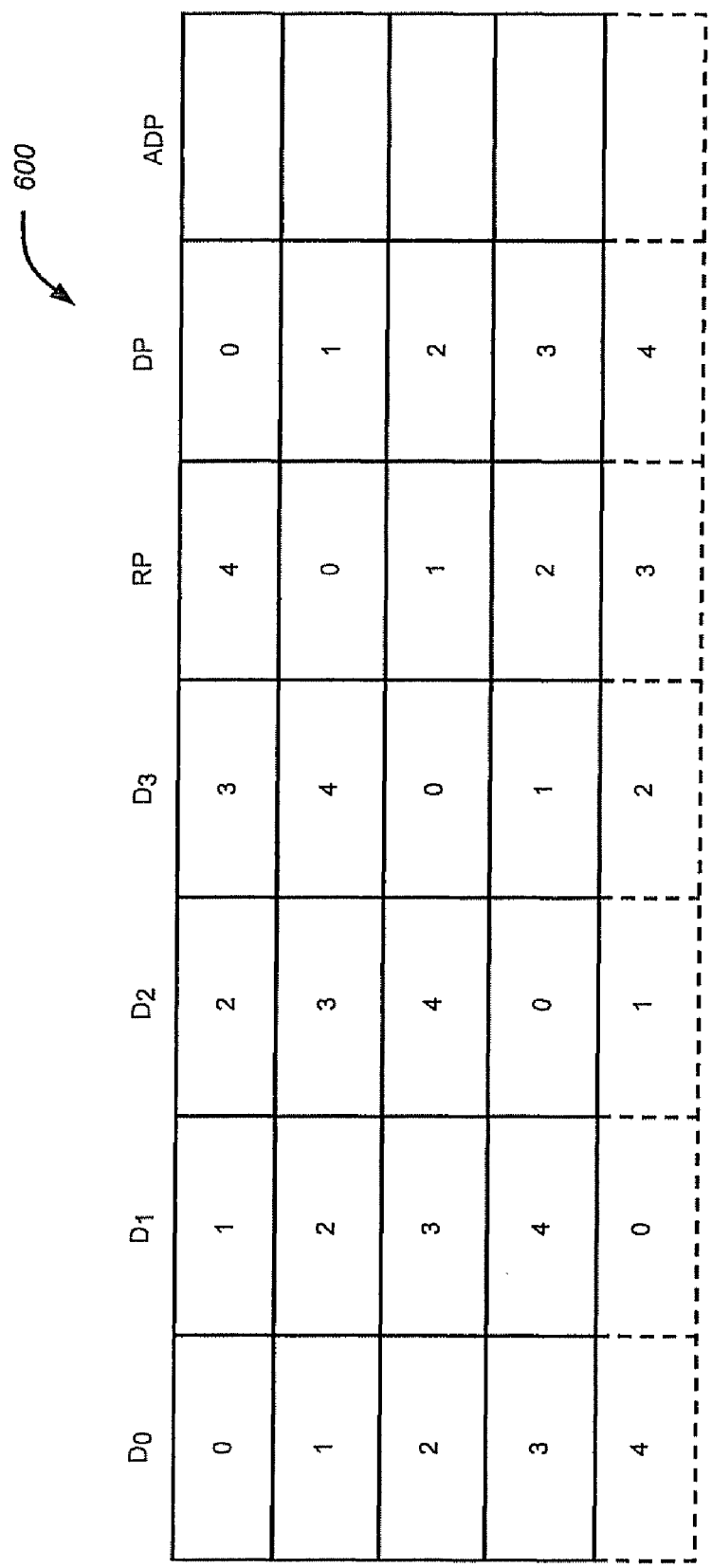
FIG. 6 is a schematic block diagram of a disk array showing diagonal parity stripes in accordance with an embodiment of the present invention.
Figure 7:
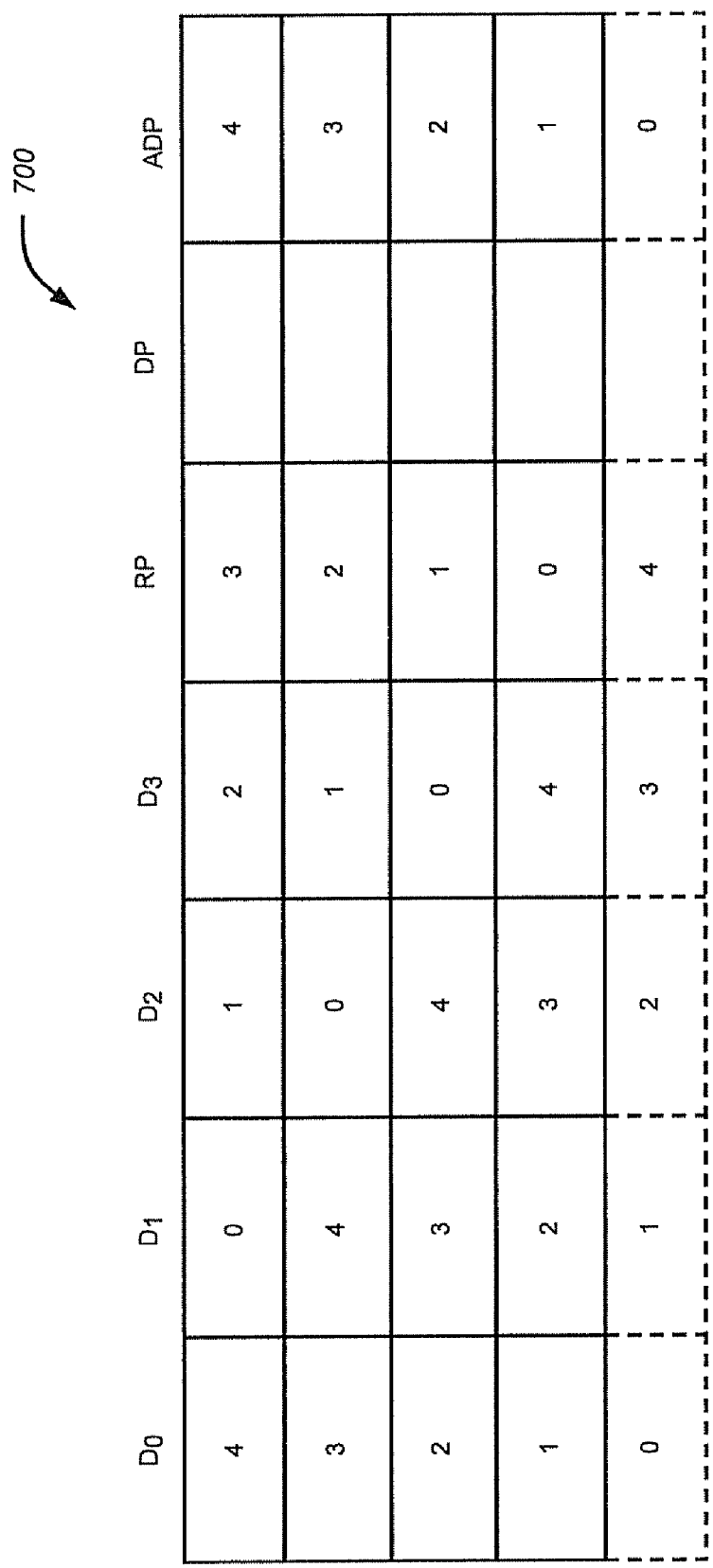
FIG. 7 is a schematic block diagram of a disk array showing anti-diagonal parity stripes in accordance with an embodiment of the present invention.

FIGS. 6 and 7 are schematic diagrams of an array showing the assignment of blocks to diagonals and anti-diagonals, respectively. FIG. 6 shows an array 600 illustrating the assignment of blocks to diagonals, wherein each block is labeled with a number corresponding to the diagonal to which it belongs. Also shown (in phantom) is the dropped diagonal that is not stored when encoding the array. Similarly, FIG. 7 shows an array 700 illustrating the assignment of blocks to anti-diagonals, including illustration (in phantom) of the dropped anti-diagonal that is not stored on the array. As noted above with reference to Tables 1 and 2, the assignment of blocks to (anti-)diagonals may be permuted as long as no single disk includes two blocks of an (anti-)diagonal thereon.

D. Disk Failure and Reconstruction

Figure 8:
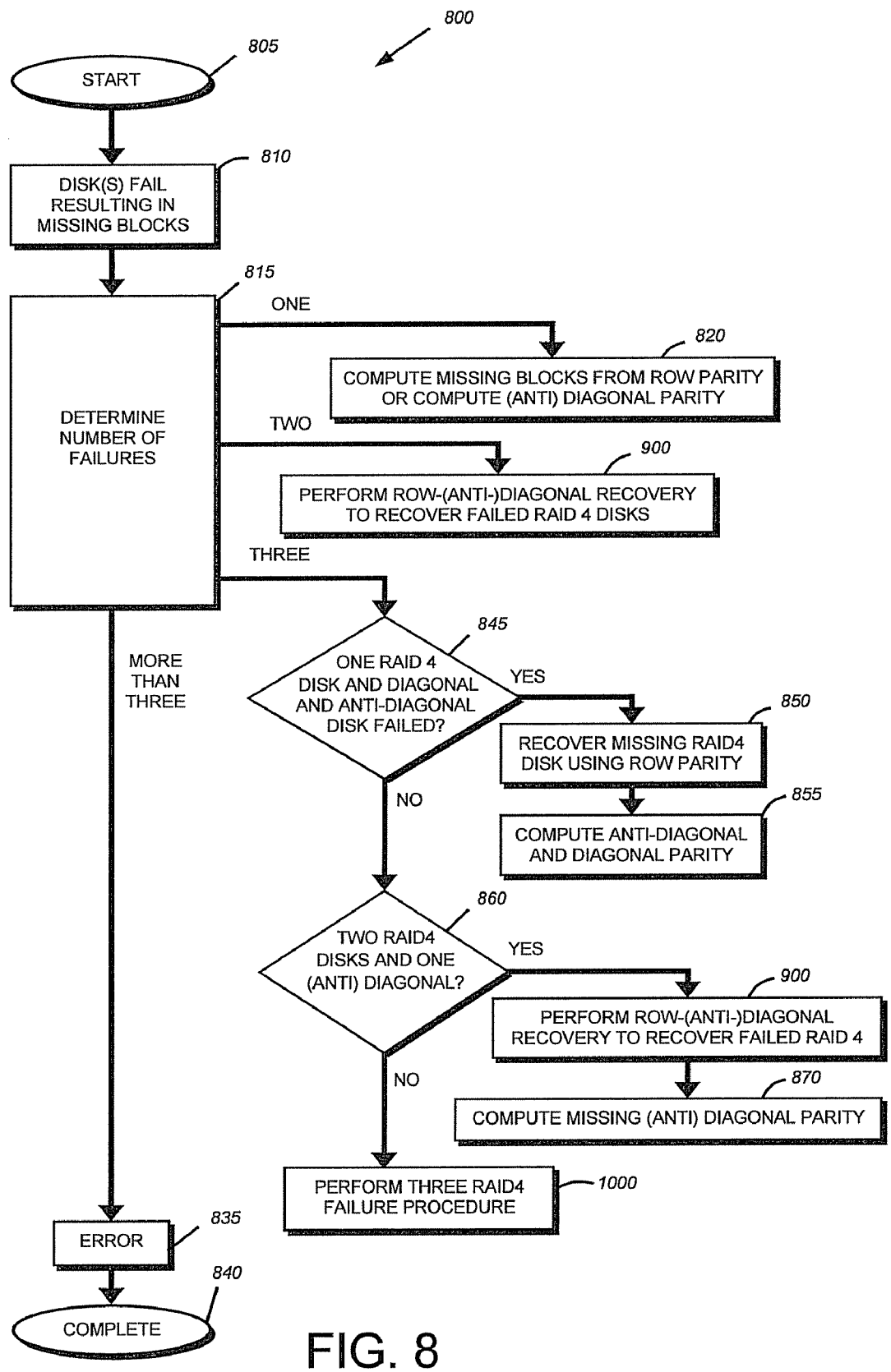
FIG. 8 is a flowchart detailing the steps of a procedure for performing reconstruction in accordance with an embodiment of the present invention.

FIG. 8 is a flowchart detailing the steps of a procedure 800 for determining an appropriate reconstruction procedure to perform when utilizing the novel TP technique of the present invention. As noted above, for the purposes of this description, the term "RAID 4 disks" shall mean the data and row parity disks. It should be noted that the data and row parity disks may be arranged in non-RAID 4 configurations, e.g., RAID 5. The procedure 800 begins in step 805 and continues to step 810 where one or more disk failures occur. This may occur due to, for example, the complete failure of a disk or a media error to a subset of a disk. In step 815, the RAID system 340 determines whether one, two, three or more disks have failed so that the appropriate reconstruction technique may be utilized to recover from the failed disks. If a single (one) disk has failed, the procedure branches to step 820 where the system recovers the single disk utilizing conventional row parity to compute the missing blocks if the failed disk is a RAID 4 disk, or by computing the (anti-)diagonal parity if the failed disk is an (anti-)diagonal parity disk.

If two disks have failed, then the procedure branches to step 900 where the R-D parity technique is performed to recover from the double disk failure. The R-D parity recovery technique may utilize either the row and the diagonal or the row and the anti-diagonal parity for recovery. If more than three disks have failed, then an error condition results in step 835 before the procedure 800 completes in step 840.

However, if three disks have failed, then a determination is made in step 845 as to whether one RAID 4 disk and the diagonal and anti-diagonal parity disks have failed. If so, then the array may be recovered by first, in step 850, recovering the missing RAID 4 disk using the conventional row parity technique before re-computing the diagonal and anti-diagonal parity in step 855. Otherwise, the procedure continues to step 860 where the RAID system determines whether two RAID 4 disks and one (anti-)diagonal disk have failed. If so, the system performs the R-D parity recovery technique to recover the failed RAID 4 disks in step 900. This recovery is performed using the good (anti-)diagonal parity, i.e., if the diagonal disk has failed, then the R-D parity recovery technique uses anti-diagonal parity, however if the anti-diagonal parity disk has failed, then the R-D parity recovery technique uses diagonal parity. Once the R-D parity recovery is complete in step 900, the system then re-computes the missing (anti-)diagonal parity in step 870. However, if in step 860 it is determined that three RAID 4 disks have failed, then the procedure branches to step 1000 where the RAID system performs a novel three RAID 4 failure procedure.

E. Row-(Anti-) Diagonal Recovery

Since there is no distinction between the row parity disk and the data disks when assigning disks to diagonals, the distinction between the row parity and data disks can be ignored when dealing with recovery from (anti-)diagonal parity sets. To illustrate, consider that any two data disks or any one data disk and the row parity disk are lost. A lost block of a parity set can be restored only if all other blocks that compose the parity set are available. An artifact of XOR parity is that all blocks are mathematically equivalent, whether they originally hold data or parity. For example, consider the parity construction a⊕b⊕c=d, wherein "⊕" represents an XOR operator. XORing both sides with d gives a⊕b⊕c⊕d=0. Therefore, all the data disks and the row parity disk may be treated the same during reconstruction.

In each of these disks, exactly one (anti-)diagonal is not represented. Accordingly, reconstruction can begin on the other disk that does not contain a member of that (anti-)diagonal. Since two disks have failed, in most cases, there are two blocks that can be reconstructed immediately from (anti-)diagonal parity data. This is true unless one of the (anti-)diagonal that is missing only one block is the (anti-)diagonal for which no parity is stored. But since at most one disk is missing data for that parity set, there is at least one block that can be reconstructed immediately. Once one or two blocks are reconstructed from (anti-)diagonal parity, then the other missing block in that or those row(s) can be reconstructed from row parity, as at that point only one block is missing from the row parity sets having blocks reconstructed using (anti-)diagonal parity (which does not include the (anti-)diagonal parity blocks). Once those blocks are reconstructed, one or two more blocks can be reconstructed that are on the same (anti-)diagonal (s) as the row blocks.

Therefore, reconstruction proceeds by a series of (anti-)diagonal, then horizontal, "moves." Since p is prime, all series of horizontal then (anti-)diagonal moves "hit" every row of a stripe before hitting the same row twice. Yet there is one (anti-)diagonal over which no (anti-)diagonal move is possible because parity is not stored for that (anti-)diagonal. Without losing generality, the (anti-)diagonals are numbered from 0 to p−1, and parity is computed for all but (anti-)diagonal 0. Thus, no (anti-)diagonal moves are possible along (anti-)diagonal 0. For disks that are a given distance apart in the array, there is always a fixed sequence of (anti-)diagonal that can be reconstructed ending with (anti-)diagonal 0. If the disks are numbered from 0 to p−1, and wrap around among the disks is considered so that disk p−1 (the row parity disk) is adjacent to disk 0, then there are (p−1) sequences to consider. Each sequence corresponds to the reconstruction of any pair of disks separated by that distance. Table 3 illustrates sequences for, e.g., p=13:

TABLE 3

| Disks 1 apart: | 1 | 2 | 3 | 4 | 5 | 6 | 7 | 8 | 9 | 10 | 11 | 12 | 0 |
|---|---|---|---|---|---|---|---|---|---|---|---|---|---|
| Disks 2 apart: | 2 | 4 | 6 | 8 | 10 | 12 | 1 | 3 | 5 | 7 | 9 | 11 | 0 |
| Disks 3 apart: | 3 | 6 | 9 | 12 | 2 | 5 | 8 | 11 | 1 | 4 | 7 | 10 | 0 |
| Disks 4 apart: | 4 | 8 | 12 | 3 | 7 | 11 | 2 | 6 | 10 | 1 | 5 | 9 | 0 |
| Disks 5 apart: | 5 | 10 | 2 | 7 | 12 | 4 | 9 | 1 | 6 | 11 | 3 | 8 | 0 |
| Disks 6 apart: | 6 | 12 | 5 | 11 | 4 | 10 | 3 | 9 | 2 | 8 | 1 | 7 | 0 |
| Disks 7 apart: | 7 | 1 | 8 | 2 | 9 | 3 | 10 | 4 | 11 | 5 | 12 | 6 | 0 |
| Disks 8 apart: | 8 | 3 | 11 | 6 | 1 | 9 | 4 | 12 | 7 | 2 | 10 | 5 | 0 |
| Disks 9 apart: | 9 | 5 | 1 | 10 | 6 | 2 | 11 | 7 | 3 | 12 | 8 | 4 | 0 |
| Disks 10 apart: | 10 | 7 | 4 | 1 | 11 | 8 | 5 | 2 | 12 | 9 | 6 | 3 | 0 |
| Disks 11 apart: | 11 | 9 | 7 | 5 | 3 | 1 | 12 | 10 | 8 | 6 | 4 | 2 | 0 |
| Disks 12 apart: | 12 | 11 | 10 | 9 | 8 | 7 | 6 | 5 | 4 | 3 | 2 | 1 | 0 |

Note that the sequence for disks k apart always starts at diagonal k, and continues by incrementing the diagonal by k each time, modulo p, and ends at p, mod p=0. Note also that the first p−1 terms of the sequence for disks k apart is the reverse of the first p−1 terms of the sequence for disks p−k apart.

The starting position on a sequence depends on which pair of disks has failed. When the disks and diagonals are numbered according to the previous description, i.e., the disks are numbered sequentially from 0 to n−2, the rows are numbered sequentially from 0 to n−3 and block i of disk j belongs to diagonal parity set (i+j+1)mod(n−2) in each disk j that has failed, the missing diagonal is always diagonal j. Therefore, for a pair of disks separated by k, the two diagonals for which repair can begin are j and (j+k)mod n−2. Note that these two diagonals are always adjacent in the reconstruction sequence for disks k apart. A similar calculation can be made regarding anti-diagonals. Reconstruction proceeds in a sequence of diagonals determined by moving to the right from the starting point in the two sequences, for disks k apart starting at symbol (j+k)mod(n−2) and for disks p−k apart, starting at symbol j, where k<p/2. Accordingly, it is always possible to fully reconstruct if any combination of two data disks or one data disk and the row parity disk fails. If the diagonal parity disk and one other disk fail, it is a simple matter to reconstruct the other failed disk, whether it be data or row parity from the stored row parity and then to reconstruct the diagonal parity disk.

It should be noted that not all data blocks belong to a (anti-)diagonal for which parity is computed. In fact, (anti-)diagonal parity is computed for only (p−1)/p of the data and row parity blocks. A single block update is expensive, as row parity must be recalculated for that block as well as (anti-)diagonal parity for the block. Then, when the row parity for the block is updated, the change must be added into the (anti-)diagonal parity block for the row parity block as well. However, this can be simplified in systems where a stripe is one "block" wide and is composed of subblocks used only for parity computation. Here, a parity update is computed that is added to the row parity. Portions of the same parity update block are also added directly to portions of the (anti-)diagonal parity block for the stripe.

The (anti-)diagonal parity blocks on disk (ADP)DP include the row parity blocks in their XOR computation. In other words, the (anti-)diagonal parity stored on the disk (ADP)DP is computed not only in accordance with the contents of the data disks but also with the contents of the row parity disk. By encoding the (anti-)diagonal parity blocks as shown in array 500, the system can recover from any two concurrent disk failures despite the missing (anti-)diagonal parity (e.g., in the case of diagonal parity, the diagonal number 8). This results from the fact that the row parity blocks are factored into the computations of the (anti-)diagonal parity blocks stored on the (anti-)diagonal parity disk DP/ADP. In contrast, the conventional EVENODD technique does not factor the row parity blocks into the computations of the diagonal parity sets. Rather, the conventional EVENODD approach factors the missing diagonal parity block into each of the other diagonal parity blocks stored on its diagonal parity disk.

Operationally, if an (anti-)diagonal parity disk and any data disk are lost, recovery is achieved by first rebuilding the data disk from row parity (e.g., in accordance with a conventional RAID-4 reconstruction technique) and then rebuilding the (anti-)diagonal parity disk. Similarly, if the two parity disks are lost, recovery is achieved by first rebuilding the row parity disk from the data disks and then rebuilding the (anti-)diagonal parity disk. On the other hand, losing any pair of data disks allows immediate recovery of one block from at least one and possibly two of the (anti-)diagonal parity sets. From there, the system is able to recover the rest of the missing data blocks. Notably, losing the row parity disk and a data disk is exactly the same as losing two data disks, and recovery may be achieved in the same manner.

Figure 9:
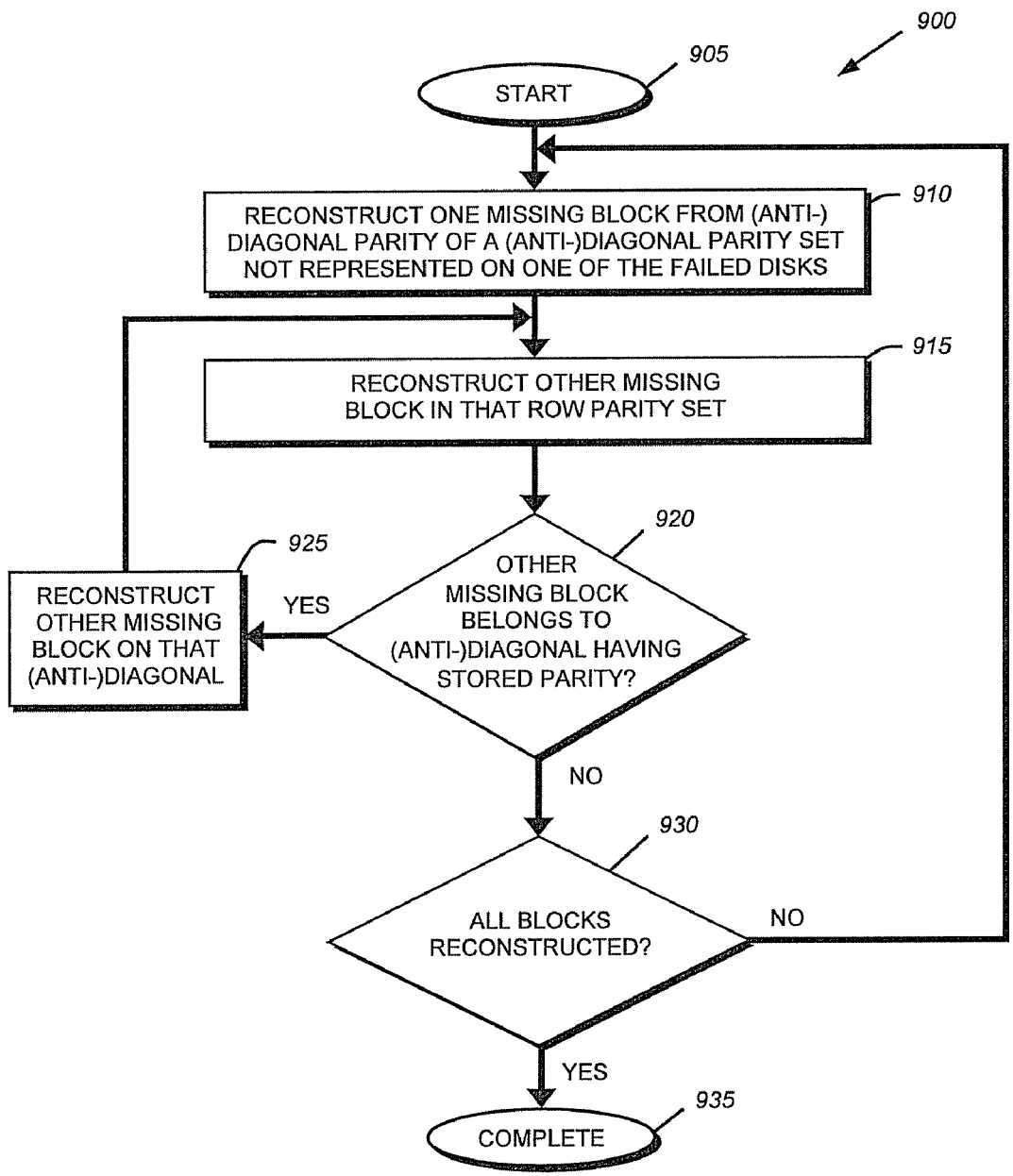
FIG. 9 is a flowchart detailing the steps of a procedure for performing row-diagonal (R-D) parity reconstruction in accordance with an embodiment of the present invention.

FIG. 9 is a flowchart illustrating the sequence of steps involved in a recovery (reconstruction process) procedure 900 for Row-(Anti-)Diagonal parity. Illustratively, the procedure 900 initiates when the RAID system 340 determines that a double failure has occurred. Alternately, procedure 900 may be invoked after the triple failure procedure 1000 has recovered one of the disks, thereby leaving a double failure. It should be noted that procedure 900 may be performed using either a diagonal or an anti-diagonal. An (anti-)diagonal parity block is stored on the DP/ADP disk for all but one (anti-)diagonal. Therefore, the procedure 900 starts at step 905 and proceeds to step 910 where reconstruction of at least one, and usually two, of the missing blocks is initiated using (anti-)diagonal parity.

Once a missing block is reconstructed, reconstruction of a row may be completed by reconstructing the other missing block on that row using row parity (step 915). When that other block is reconstructed, a determination is made in step 920 as to whether the block belongs to a (anti-)diagonal for which there is stored parity. If the block belongs to a (anti-)diagonal for which there is parity, the other missing block on that (anti-)diagonal can be reconstructed from the other disk that is on that (anti-)diagonal using (anti-)diagonal parity (step 925). That is, for all but the missing (anti-)diagonal, once one block on the (anti-)diagonal is reconstructed, the other can be reconstructed. The sequence then returns to step 915 where the other missing block in that row parity set is reconstructed. However, if the block belongs to a (anti-)diagonal for which there is no parity (i.e, the missing (anti-)diagonal), then a determination is made in step 930 as to whether all blocks have been reconstructed. If not, the sequence returns to step 910 where the pattern of first reconstructing based on (anti-)diagonal parity, then on row parity, continues until the last data block used in computation of the missing (anti-)diagonal parity set is reached. Once all blocks have been reconstructed, the sequence ends at step 935. The missing (anti-)diagonal parity set always terminates the chain of reconstruction.

In sum, the sequence of reconstruction can be described by listing, in order, the (anti-)diagonals that can be reconstructed, starting from the first (anti-)diagonal reconstructed and ending with the missing (anti-)diagonal parity. For two failing disks j and j+k, separated by k, one sequence of (anti-)diagonals that can be reconstructed increments by k each time and the other decrements by k each time. This is because a row reconstruction moves k disks to the right (or left), and hence also moves to the next k higher (or lower) (anti-)diagonal, modulo p. In most cases, there are a plurality (e.g., at least two) parallel reconstruction threads. The exceptions are if D0, which is the disk that does not include a block of the "missing" (anti-)diagonal, and any other disk other than the (anti-)diagonal parity disk DP/ADP are lost. In that case, there is only a single stream of reconstructed blocks, ending with the block in the missing (anti-)diagonal parity set on the other missing disk.

F. Triple Parity Reconstruction

In response to one or more storage device failures within the array, the present invention illustratively provides a multi-step state machine implemented within the disk storage layer (RAID system) of the storage operating system for determining an appropriate reconstruction technique. In particular, when three RAID 4 disks fail, a triple parity recovery technique is invoked by first computing the "dropped" diagonal and anti-diagonal parity, i.e., the diagonal and anti-diagonal parity blocks that were not previously stored. The RAID system then computes a number of 4-tuple sums along an intermediate (i.e., middle) disk of the failed disks by generating a number of crosses. The 4-tuple sums are thereafter reduced to pairwise sums on the middle disk. The generated pairwise sums form a solvable system of linear equations. Illustratively, the data on the middle disk is recovered by solving the system of equations. Once a first block on the middle disk has been resolved, its solution may be substituted into other equations until all blocks on the middle disk have been recovered. Once the middle disk has been recovered, the system then performs the R-D parity technique to recover the remaining two disks.

Figure 10:
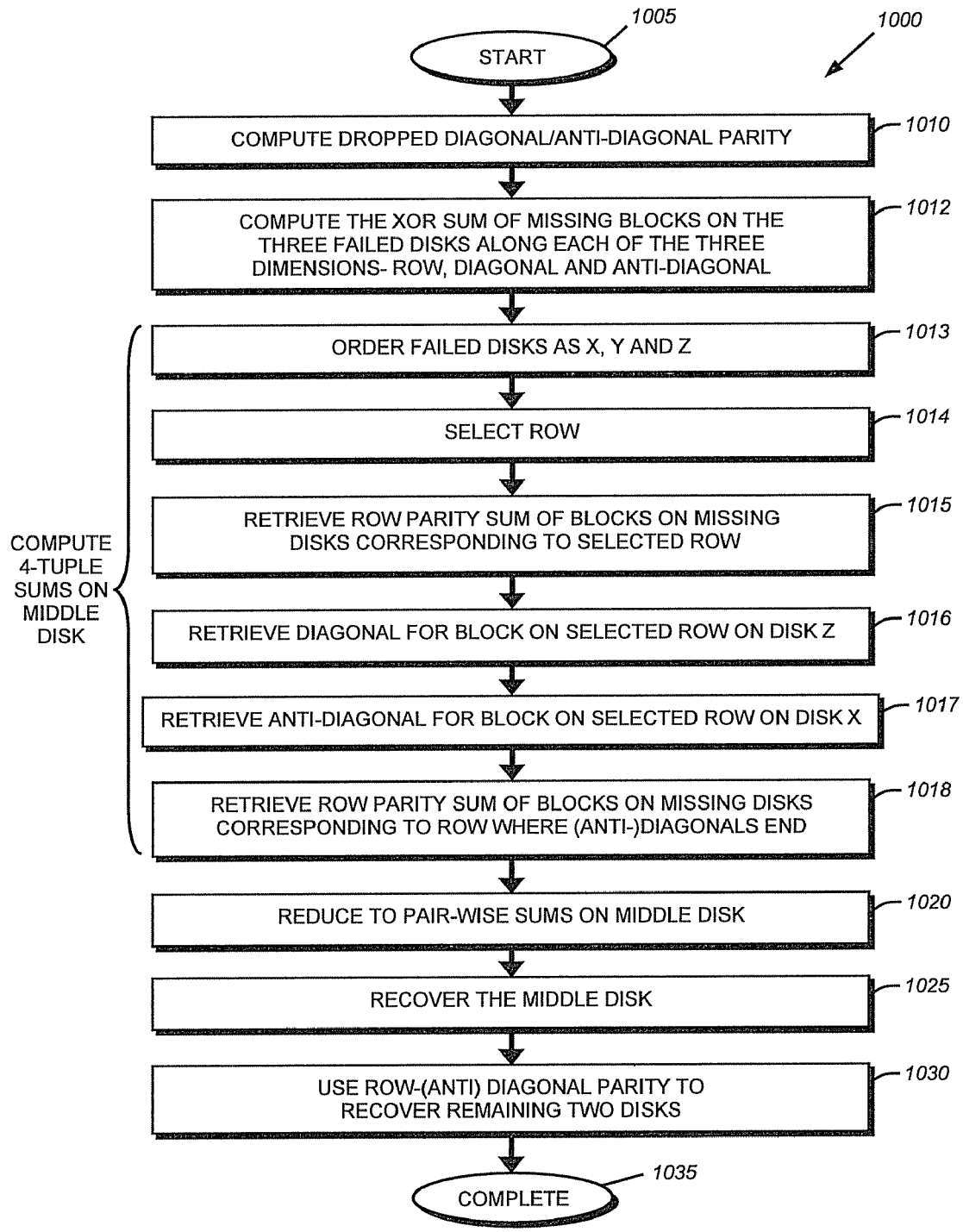
FIG. 10 is a flowchart detailing the steps of a procedure for performing triple parity reconstruction in accordance with an embodiment of the present invention.

FIG. 10 is a flowchart detailing the steps of a procedure 1000 for recovering from three failed RAID 4 disks in accordance with an embodiment of the present invention. The procedure 1000 begins in step 1005 and continues to step 1010 where the RAID system 340 computes the dropped diagonal and anti-diagonal parity. As noted, the dropped diagonal and anti-diagonal parity pertain to those (anti-)diagonals that are not stored on the disk array. For example, in the array 600 of FIG. 6, the parity for the fourth diagonal is not stored. Similarly, the parity for the $0^{th}$ anti-diagonal is not stored on an array 700 of FIG. 7. The computation of the dropped (anti-)diagonal is relatively straightforward. It may be shown that the parity for the dropped (anti-)diagonal can be computed as the sum of blocks on the (anti-)diagonal parity disk. That is:

$\Sigma\oplus$Diagonal_Parity_Blocks=$\Sigma\oplus$Data_Blocks$\oplus\Sigma\oplus$Data_Blocks_on_Dropped_Diagonal$\oplus\Sigma\oplus$Row_Parity_Blocks$\oplus\Sigma\oplus$Row_Parity_Blocks_on_Dropped_Diagonal wherein $\Sigma\oplus$ represents the sum of the XOR of the identified blocks. By noting that $\Sigma\oplus$Row_Parity_Blocks≡$\Sigma\oplus$Data_Blocks, and the fact that XORing two identical entities results in 0, this equation may be reduced to:

$\Sigma\oplus$Data_Blocks_on_Dropped_Diagonal$\oplus\Sigma\oplus$Row_Parity_Blocks_on_Dropped_Diagonal=$\Sigma\oplus$Blocks_on_Dropped_Diagonal The RAID system then identifies the failed disks as X, Y and Z having a value equal to the index of the three failed disks in the array and wherein the disks are labeled from 0–p. Thus, for example, if disks D0, D1 and D3 from array 500 fail, then X=0, Y=1 and Z=3. The system then, in step 1012 computes an algebraic operation, e.g., an XOR sum of the missing blocks on the three failed disks along each of the three dimensions—row, diagonal and anti-diagonal. Illustratively, computing this sum at this point helps to reduce the number of XOR operations required to reconstruct the remaining two disks once the middle disk has been recovered. The recovery of the dropped/missing (anti-)diagonal parity in step 1010 ensures that these XOR sums can be computed along each row, diagonal and anti-diagonal parity set.

For example, the row parity sum of missing blocks $D_{00}$, $D_{01}$ and $D_{03}$ (blocks on the first row) can be computed as $D_{00}\oplus D_{01}\oplus D_{03}=RP_0\oplus D_{02}$ Similarly, the row parity sum of missing blocks $D_{30}$, $D_{31}$, and $D_{33}$ (blocks on the fourth row) can be computed as $D_{30}\oplus D_{31}\oplus D_{33}=RP_3\oplus D_{32}$ The anti-diagonal parity sum of missing blocks $D_{00}$, $D_{11}$ and $D_{33}$ (referencing FIG. 7, these are blocks on anti-diagonal 4) can be computed as $D_{00}\oplus D_{11}\oplus D_{33}=ADP_0\oplus D_{22}$ The diagonal parity sum of missing blocks $D_{30}$, $D_{21}$ and $D_{03}$ (referencing FIG. 6, these are blocks on diagonal 3) can be computed as $D_{30}\oplus D_{21}\oplus D_{03}=DP_3\oplus D_{12}$ The RAID system then computes a total of p 4-tuple sums on the failed middle disk (steps 1013-1018). In step 1013, the disks are ordered by defining a distance between the columns of the failed disks as:

$g=Y-X$ $h=Z-Y$

Thus, using the example above of X=0, Y=1 and Z=3, g=1−0=1 and h=3−1=2. By this definition, the Y disk is the middle disk.

The system then, in step 1014, selects a row k. For example, assume k=0. The system then retrieves the sum of the row parity of blocks on the missing disks corresponding to the selected row (step 1015). In this example, the sum for row k=0 was previously computed as $D_{00}\oplus D_{01}\oplus D_{03}=RP_0\oplus D_{02}$. Then, in step 1016, the system retrieves the diagonal for the block within row k that is on disk Z. Illustratively, assuming k=0, the sum of the missing blocks on this diagonal is $D_{30}\oplus D_{21}\oplus D_{03}=DP_3\oplus D_{12}$. The RAID system then retrieves the anti-diagonal for the block on row k on disk X in step 1017. Illustratively, this is equal to $D_{00}\oplus D_{11}\oplus D_{33}=ADP_0\oplus D_{22}$.

We term the row on which the (anti-)diagonal terminates as row q. The RAID system then, in step 1018, retrieves the row parity sum of blocks on missing disks corresponding to row q, which is illustratively $D_{30} \oplus D_{31} \oplus D_{33} = RP_3 \oplus D_{32}$.

In the illustrative embodiment, at each step 1015, 1016, 1017 and 1018, the retrieved sum is XORed together with the previous sum. For the example of row k=0, the total is:

$$D_{00} \oplus D_{01} \oplus D_{03} \oplus D_{30} \oplus D_{31} \oplus D_{33} \oplus D_{00} \oplus D_{11} \oplus D_{33} \oplus D_{30} \oplus D_{21}$$
$$\oplus D_{03} = RP_0 \oplus D_{02} \oplus RP_3 \oplus D_{32} \oplus ADP_0 \oplus D_{22} \oplus DP_3 \oplus D_{12}$$

which reduces to:

$$D_{01} \oplus D_{11} \oplus D_{21} \oplus D_{31} = RP_0 \oplus D_{02} \oplus RP_3 \oplus D_{32} \oplus ADP_0 \oplus D_{22} \oplus DP_3 \oplus D_{12}$$

Figure 11:
FIG. 11 is a schematic block diagram of a disk array showing disk identifiers in accordance with an embodiment of the present invention.

The right hand side of this equation is known, thereby leaving an equation with four unknowns on the middle disk. More generally, duplicate terms in the top and bottom rows at each cross are canceled, thereby resulting in the sum of at most four blocks on the middle disk. To solve for the missing data, p such sums are computed by starting crosses at different stripes. Since the array only contains p−1 rows, the pth 4-tuple sum is formed by constructing a cross using the dropped diagonal and anti-diagonal disks corresponding to disks to Z and X respectively. For example, in FIG. 11, the pth 4-tuple sum is constructed using the following four XOR sums:

| | |
|---|---|
| (Diagonal) | $D_{40} \oplus D_{01} \oplus D_{23}$ |
| (Anti-Diagonal) | $D_{43} \oplus D_{11} \oplus D_{20}$ |
| (Rows) | $D_{40} \oplus D_{41} \oplus D_{43}$ |
| | $D_{20} \oplus D_{21} \oplus D_{23}$ | which results in the 4-tuple sum of:

$$D_{41} \oplus D_{01} \oplus D_{11} \oplus D_{21}$$

In this example, the first cross (based on row 0) results in a tuple consisting of [0, 1, 2, 3] which represents the blocks on the middle disk that are summed. By generating p crosses, the tuple corresponding to row k can be represented by [k, k+g, k+h, k+h+g] wherein all of the addition is performed modulo p.

It should be noted that the step of computing 4-tuple sums can be performed assuming an arbitrary ordering of the failed disks. In the above example the order chosen is X=0, Y=1 and Z=2. Alternately, a different ordering X=0, Y=2 and Z=1 could have been chosen. In this case the middle disk would be Y=2. The values in this case are g=Y−X=2 and h=Z−Y=−1. It is easy to see that for 3 disk failures there are a total of 6 possible orderings. Since each ordering results in a different set of values for g and h, the number of tuples required to reduce 4-tuple sums to pairwise sums is different. Hence, to minimize the number of XOR operations required, the ordering which results in the fewest set of tuples required to reduce to a pair-wise sum is chosen.

Also, the distance between erasure columns is important in this step. Clearly, if g=h, then two additional blocks on the middle disk cancel out converting the 4-tuple to a 2-tuple. Hence the next step is not required for equidistant/symmetric failures. Also, representing the tuple corresponding to row '0' as [0, g, h, h+g], one can generalize equi-distant failures to the condition g≡h mod (p) or [(g−h) mod p=0]. This condition implies that the second and the third blocks within the 4-tuple are identical and hence cancel out.

Once the 4-tuple sums have been constructed, the RAID system reduces the 4-tuple sums to pairwise sums on the middle disk in step 1020. To form a pairwise sum, the system selects a subset of the equations such that the common blocks cancel out leaving only two blocks. Computing the sum for the subset results in a pairwise sum of blocks on the middle disk.

There may be multiple ways for choosing a subset of tuples in order to reduce them to a pairwise sum. In one embodiment the subset of tuples is chosen by starting with a tuple corresponding to row k and choosing subsequent tuples at an offset g (or h) from the last. At each step, common blocks are cancelled and the process continues until only two unknown blocks are left remaining. This results in a pairwise sum.

For example, starting with the 4-tuple sum corresponding to row 0, i.e., [0, g, h, g+h], it can be easily seen that choosing another at an offset g, helps cancel two blocks while adding two new blocks, thus keeping the total number of unknown blocks the same. This is because the tuple corresponding to row g is [g, 2g, h+g, 2g+h] which helps cancel common blocks g and h+g since they are present in both tuples. (all additions and multiplications are here assumed to be modulo p). Hence, starting with the 4-tuple corresponding to row 0 (lets treat this as the first step), and selecting consecutive tuples at an offset g, step m results in the sum of blocks [0, (m*g) mod p, h, (m*g+h) mod p].

Given that p is a prime and the condition {g, h<p} holds, one can always find a m (0<m<p) such that [(m*g+h) mod p]=0 is true. Similarly, one can always find a m such that [(m*g−h) mod p]=0 is true. Hence, by choosing a m such that [(m*g+h) mod p]=0, the first and the fourth blocks in the result [0, (m*g) mod p, h, (m*g+h) mod p] can be cancelled after the mth step. Alternatively, by choosing a m such that '[(m*g−h) mod p]=0, the second and the third blocks can be cancelled after the mth step. Since only two unknown blocks are left, the process of selecting tuples can be terminated at this step. Repeating the above step by starting with 4-tuple sums at each of the p−1 rows results in p−1 pairwise sums By performing algebraic operations, one of the equations results in a single unknown equaling a known quantity, which may then be substituted into the previous equations to solve for all unknowns on the middle disk, thereby recovering the middle disk in step 1025.

Specifically, as the construction of the array uses only p−1 rows, the pth block on disk Y can be assumed to be zero. Thus, the value of the block which is pairwise XORed with the pth block is known at the completion of creation of the pairwise sums, i.e., an equation results with only one unknown. By substituting the solution to the recovered block, and using the other pairwise sums, the remaining blocks on the middle disk may be recovered. At this point, the RAID system has reconstructed the middle disk leaving only two failed disks. As this problem has been solved previously using row diagonal parity, the system implements such R-D parity to recover the missing two disks. Accordingly, once the middle disk has been recovered, the RAID system utilizes R-D parity to recover the remaining two disks in step 900 before completing in step 1035.

There are some prime numbers that are particularly good choices for constructing the arrays. These are the prime numbers that are a power of two plus one, and that are smaller than the block size used to access the disks, and as large as or larger than the number of disks contemplated in an array. The first primes that are a power of two plus 1 are 5, 17 and 257. Of these, 5 is too small for many cases, as it would allow the disk array to contain at most 4 data disks. However, 17 and 257 are both good choices. The reason is because most storage systems divide disk storage into blocks that are a power of two in size, typically 4 k (4096) bytes, 8 k (8192) bytes, or some other similarly sized power of two. By having p=17 or p=257, diagonal parity is computed within groups of 16 or 256 rows, in arrays that contain up to 15 or 255 data disks respectively. Both of these are reasonable choices, because it is possible to evenly divide the data blocks, which are, for example, 4 k bytes large, into sub-blocks of 4 k/16=256 or 4 k/256=16 bytes each. (Anti-)diagonal parity is computed by defining (anti-)diagonals along the sub-blocks. Row parity is computed by computing parity on the entire, for example, 4 k block, in exactly the same way it would be computed in a RAID-4 or RAID-5 array without diagonal parity.

While each 4 k disk block can be divided evenly into 16 or 256 sub-blocks for the purpose of (anti-)diagonal parity set computation, implementation of this approach in software or hardware requires, in the illustrative embodiment, the XOR of just one or two contiguous, non-overlapping regions of each 4 k block onto a 4 k diagonal parity block, with each region composed of one or more sub-blocks. The data block contents are XOR'd into the (anti-)diagonal parity block in a shifting pattern, and the sub-block of each data block that belongs to the missing (anti-)diagonal parity set is excluded from contributing to the (anti-)diagonal parity block. The total computation time to add the (anti-)diagonal parity data to the (anti-)diagonal parity block can be comparable to the computation time to add the data block to the row parity block.

Advantageously, the invention provides triple disk failure parity protection in, e.g., a RAID-4 style concentrated parity format, where all the parity information is stored on three devices, such as disks. The inventive parity technique thus enables data disks to be incrementally added to disk arrays without reformatting or recalculating the existing parity information. The invention uses a minimum amount of redundant disk space, i.e., exactly three disks per array. The invention also reduces the overhead of parity computation compared to prior art approaches, such as EVENODD or STAR, for a given number of data disks. The parity computation overhead is optimal for the TP technique described herein.

It should be noted that the TP technique of the present invention may also be utilized in recovering from triple failures in other applications that rely on redundant data streams. For example, the TP technique may be utilized in data communication applications, where additional data is transmitted to reduce the reliance on retransmissions to recover from up to three lost and/or corrupted packets. Additionally, it should be noted that in alternate embodiments, other algebraic operations, other than XOR operations, may be utilized.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for recovering from three failed data storage devices, comprising:
    establishing a plurality of storage devices to hold data, referred to as the data storage devices;
    establishing a storage device to hold row parity for the data devices, referred to as the row parity storage device, and referring to the data storage devices and the row parity storage device together as a set of storage devices;
    establishing a diagonal parity storage device to hold diagonal parity computed over the set of storage devices;
    establishing an anti-diagonal parity storage device to hold anti-diagonal parity computed over the set of storage devices;
    in the event of a failure of three data storage devices of the set of storage devices, choosing a first failed storage device to restore;
    computing a missing block of the first failed storage device using remaining storage devices of the set of storage devices, and the diagonal parity storage device, and the anti-diagonal parity storage device; and
    using diagonal parity restoration techniques to restore the remaining two failed storage devices.

2. The method as in claim 1, further comprising:
solving for a value of the missing block using equations generated from the remaining storage devices of the set of storage devices, and the diagonal parity storage device, and the anti-diagonal parity storage device.

3. The method as in claim 1, further comprising:
treating one row of each storage device of the set of storage devices as holding a data block of zero value to assist in recovering the missing block of the first failed storage device.

4. The method as in claim 1, further comprising:
using a magnetic disk as the storage device.

5. The method as in claim 1, further comprising:
using an electronic random memory as the storage device.

6. The method as in claim 1, further comprising:
using an optical memory as the storage device.

7. The method as in claim 1, further comprising:
using a DVD as the storage device.

8. The method as in claim 1, further comprising:
using a magnetic tape as the storage device.

9. The method as in claim 1, further comprising:
using a micro-electro mechanical memory as the storage device.

10. The method as in claim 1, further comprising:
using a bubble memory as the storage device.

11. A computer data storage system apparatus, comprising:
    a plurality of storage devices to hold data, referred to as the data storage devices;
    a storage device to hold row parity for the data storage devices, referred to as the row parity storage device, and referring to the data storage devices and the row parity storage device together as a set of storage devices;
    a diagonal parity storage device to hold diagonal parity computed over the set of storage devices;
    an anti-diagonal parity storage device to hold anti-diagonal parity computed over the set of storage devices;
    in the event of a failure of three data storage devices of the set of storage devices, a processor to choose a first failed storage device to restore;
    a process executing on the processor to compute a missing block of the first failed storage device by solving for a value of the block using equations generated from the remaining storage devices of the set of storage devices, and the diagonal parity storage device, and the anti-diagonal parity storage device; and
    the processor to use diagonal parity restoration techniques to restore the remaining two failed storage devices, to recover from three failed data storage devices.

12. The apparatus as in claim 11, further comprising:
the processor executing a process to solve for the value of the missing block using equations generated from the remaining storage devices of the set of storage devices, and the diagonal parity storage device, and the anti-diagonal parity storage device.

13. The apparatus as in claim 11, further comprising:
the processor to treat one row of each storage device of the set of storage devices as holding a data block of zero value to assist in recovering the missing block of the first failed storage device.

14. The apparatus as in claim 11, further comprising:
a magnetic disk used as the storage device.

15. The apparatus as in claim 11, further comprising:
an electronic random memory used as the storage device.

16. The apparatus as in claim 11, further comprising:
an optical memory used as the storage device.

17. The apparatus as in claim 11, further comprising:
a DVD used as the storage device.

18. The apparatus as in claim 11, further comprising:
a magnetic tape used as the storage device.

19. The apparatus as in claim 11, further comprising:
a micro-electro mechanical memory used as the storage device.

20. The apparatus as in claim 11, further comprising:
a bubble memory used as the storage device.

21. A non-transitory computer readable storage media, comprising:
said computer readable storage media containing program instructions for execution on a processor for a method of recovering from three failed data storage devices, the program instructions for,
establishing a plurality of storage devices to hold data, referred to as the data storage devices;
establishing a storage device to hold row parity for the data devices, referred to as the row parity storage device, and referring to the data storage devices and the row parity storage device together as a set of storage devices;
establishing a diagonal parity storage device to hold diagonal parity computed over the set of storage devices;
establishing an anti-diagonal parity storage device to hold anti-diagonal parity computed over the set of storage devices;
in the event of a failure of three data storage devices of the set of storage devices, choosing a first failed storage device to restore;
computing a missing block of the first failed storage device by solving for a value of the block using equations generated from the remaining storage devices of the set of storage devices, and the diagonal parity storage device, and the anti-diagonal parity storage device; and
using diagonal parity restoration techniques to restore the remaining two failed storage devices.

22. A method for recovering from three failed data storage devices in a computer data storage system having a plurality of storage devices to hold data, referred to as the data storage devices, and having a storage device to hold row parity for the data storage devices, referred to as the row parity storage device, and referring to the data storage devices and the row parity storage device together as a set of storage devices, comprising:
establishing a diagonal parity storage device to hold diagonal parity computed over the set of storage devices;
establishing an anti-diagonal parity storage device to hold anti-diagonal parity computed over the set of storage devices;
configuring the data storage system to respond to a failure of three storage devices of the set of storage devices by choosing a first failed storage device to restore;
configuring the data storage system to compute a missing block of the first failed storage device by using the remaining storage devices of the set of storage devices, and the diagonal parity storage device, and the anti-diagonal parity storage device; and
configuring the data storage system to use diagonal parity restoration techniques to restore the remaining two failed storage devices.

\* \* \* \* \*

UNITED STATES PATENT AND TRADEMARK OFFICE
CERTIFICATE OF CORRECTION

| | | |
|---|---|---|
| PATENT NO. | : 8,010,874 B2 | Page 1 of 1 |
| APPLICATION NO. | : 12/613743 | |
| DATED | : August 30, 2011 | |
| INVENTOR(S) | : Peter F. Corbett et al. | |

It is certified that error appears in the above-identified patent and that said Letters Patent is hereby corrected as shown below:

In Col. 25, lines 56-57 should read:
--establishing a storage device to hold row parity for the data <u>storage</u> devices, referred to as the row parity data storage device, and--.

Signed and Sealed this
Third Day of July, 2012

David J. Kappos
*Director of the United States Patent and Trademark Office*